United States Patent
Orlov et al.

(10) Patent No.: US 10,321,275 B1
(45) Date of Patent: Jun. 11, 2019

(54) MULTI-FREQUENCY USER TRACKING SYSTEM

(71) Applicant: AMAZON TECHNOLOGIES, INC., Seattle, WA (US)

(72) Inventors: Nikolai Orlov, Toronto (CA); Nathan Pius O'Neill, Snohomish, WA (US); Jeremy Samuel De Bonet, Southborough, MA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/273,091

(22) Filed: Sep. 22, 2016

(51) Int. Cl.
  *H04W 24/00* (2009.01)
  *H04W 4/04* (2009.01)
  *H04W 4/021* (2018.01)

(52) U.S. Cl.
  CPC .......... *H04W 4/043* (2013.01); *H04W 4/021* (2013.01)

(58) Field of Classification Search
  CPC .................................................. H04W 4/043
  USPC ................... 455/456.1; 343/835; 348/222.1; 700/276
  See application file for complete search history.

(56) References Cited

U.S. PATENT DOCUMENTS

| | | | |
|---|---|---|---|
| 4,985,705 A * | 1/1991 | Stammler | G01S 7/003 340/910 |
| 7,225,980 B2 | 6/2007 | Ku et al. | |
| 7,949,568 B2 | 5/2011 | Fano et al. | |
| 8,009,864 B2 | 8/2011 | Linaker et al. | |
| 8,189,855 B2 | 5/2012 | Opalach et al. | |
| 8,630,924 B2 | 1/2014 | Groenevelt et al. | |
| 9,235,928 B2 | 1/2016 | Medioni et al. | |
| 2007/0069021 A1 * | 3/2007 | Elrod | G06K 17/00 235/451 |
| 2011/0011936 A1 | 1/2011 | Morandi et al. | |
| 2012/0284132 A1 | 11/2012 | Kim et al. | |
| 2013/0284806 A1 | 10/2013 | Margalit | |

(Continued)

OTHER PUBLICATIONS

Asthana, et al., "An indoor wireless system for personalized shopping assistance", CiteSeerX, In Proceedings of IEEE Workshop on Mobile Computing Systems and Applications, 1994; [retrieved on Jun. 30, 2013]. Retrieved from the Internet: <URL:http://citeseerx.ist.psu.edu/viewdoc/summary?doi=10.1.1.127.3033>.

(Continued)

*Primary Examiner* — Tan H Trinh
(74) *Attorney, Agent, or Firm* — Lindauer Law, PLLC

(57) ABSTRACT

A facility is equipped with floor tiles. Each tile is equipped with transmitters that transmit on specific frequencies. A particular set of frequencies identifies a particular floor tile and a particular segment on the floor tile. A user electromagnetically couples to one or more antennas of the tile, acting as a signal path for the signals on the particular set of frequencies. A receiver detects these signals, and the information about the frequencies detected and relative signal strength may be used to determine a location of the user within the facility. Receivers in the floor tiles allow a first tile to transmit its set of frequencies and a second tile to receive the set of frequencies and determine where the user has stepped from. By concatenating these steps a path of the user may be determined. Receivers in shelves facilitate disambiguation of one user from another when interacting with items.

26 Claims, 16 Drawing Sheets

(56) References Cited

U.S. PATENT DOCUMENTS

| | | | | |
|---|---|---|---|---|
| 2014/0307118 | A1* | 10/2014 | MacKinnon | A61B 5/002 348/222.1 |
| 2015/0009088 | A1* | 1/2015 | Lavedas | H01Q 7/00 343/867 |
| 2015/0025690 | A1* | 1/2015 | Abuelsaad | G05D 23/1934 700/276 |
| 2015/0086107 | A1 | 3/2015 | Dedeoglu et al. | |
| 2016/0043473 | A1* | 2/2016 | Walker | H01Q 1/38 343/835 |

OTHER PUBLICATIONS

Hasegawa, et al., "Human Body Equivalent Phantom for Analyzing of Surface and Space Propagation in MHz-Band Signal Transmission", Department of Electronics, Kyoto Institute of Technology. Retrievable from Internet: <<http://ieeexplore.ieee.org/document/7481823/>>.

Kalnikaite, et al., "How to Nudge In Situ: Designing Lambent Devices to Deliver Information Salience in Supermarkets", ACM, In proceeding of: UbiComp 2011: Ubiquitous Computing, 13th International Conference, UbiComp 2011, Beijing, China, Sep. 17-21, 2011. Retrieved from Internet: <URL:hhttp://www.researchgate.net/publication/221568350_How_to_nudge_in_Situ_designing_lambent_devices_to_deliver_salient_information_in_supermarkets>.

Pop, Cristian, "Introduction to the BodyCom Technology", AN1391, DS01391A, Microchip Technology, Inc., May 2, 2011.

Valtonen, Miika, "Technologies for Smart Environments: Capacitive User Tracking and Proactive Fuzzy Control", Tampere University of Technology. Publication 1044. 2012. Retrieved from Internet: <<http://dspace.cc.tut.fi/dpub/bitstream/handle/123456789/21002/valtonen.pdf?sequence=3&isAllowed=y>>.

Vu, et al., "Distinguishing Users with Capacitive Touch Communication", WINLAB, Rutgers University, In proceedings of: The 18th Annual International Conference on Mobile Computing and Networking ("MobiCom'12"), Aug. 22-26, 2012, Istanbul, Turkey.

* cited by examiner

MULTI-FREQUENCY USER TRACKING SYSTEM

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas, such as in a shopping area, and customers can pick items from inventory and take them to a cashier for purchase, rental, and so forth.

Many physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor quantity or movement of users, inventory, or other objects within the facility.

Other types of facilities may also benefit from tracking of users or other objects. For example, hospitals may wish to track patients, airports may wish to track passengers, and so forth.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
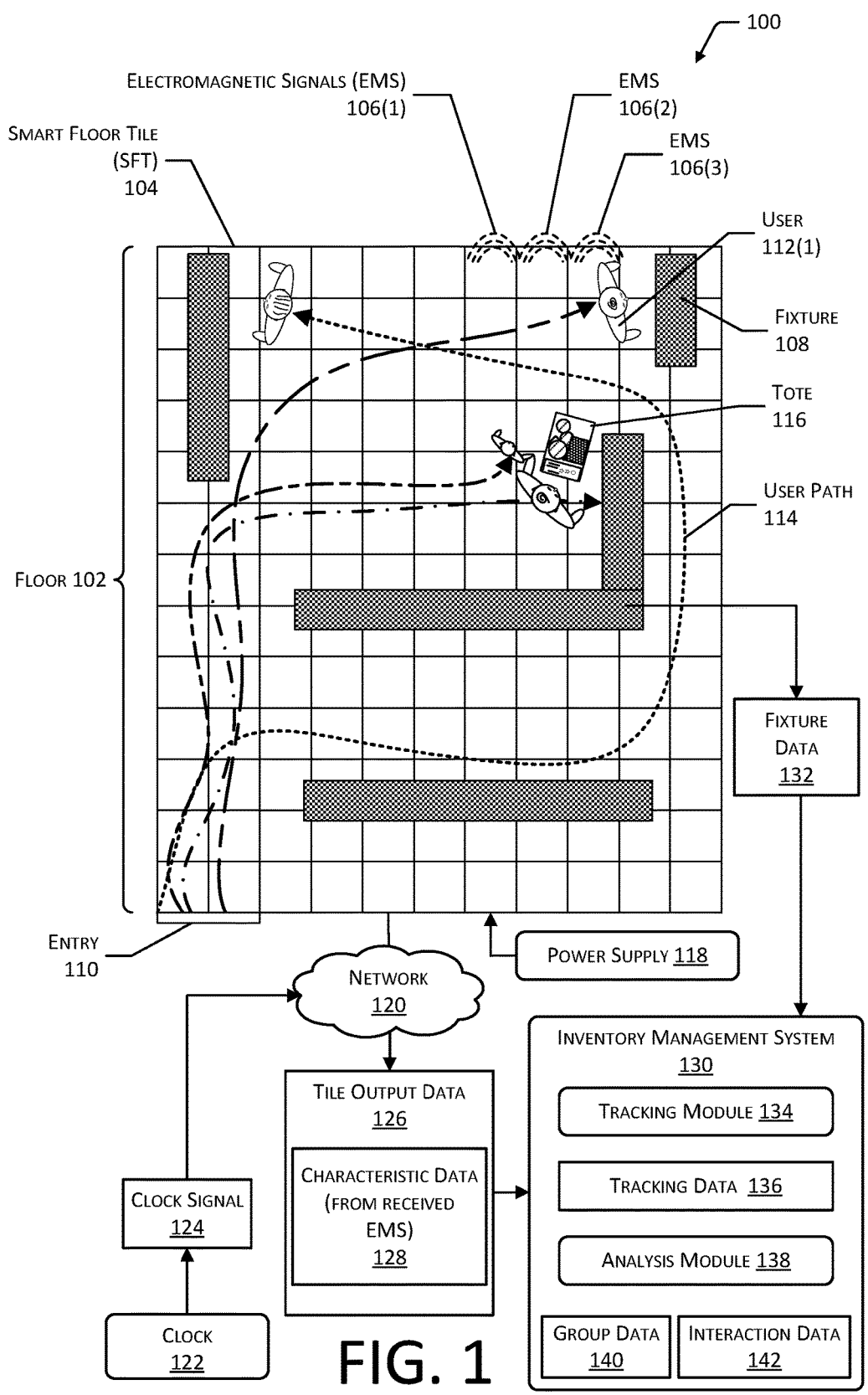
FIG. 1 illustrates a system using signals emitted by smart floor tiles to generate tracking data about movement of users within a facility, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

Described in this disclosure are systems and techniques for generating data in a materials handling facility (facility). The facility may include, or have access to, an inventory management system. The inventory management system may be configured to maintain information about items, users, condition of the facility, and so forth. For example, the inventory management system may maintain data indicative of a number of items at a particular fixture, what items a particular user is ordered to pick, how many items have been picked or placed at the fixture, requests for assistance, environmental status of the facility, and so forth.

Operation of the facility may be facilitated by using one or more sensors to acquire information about interactions in the facility. The inventory management system may process the sensor data from the one or more sensors to determine tracking data, interaction data, and so forth. The tracking data provides information about the location of a user within the facility, their path through the facility, and so forth. The interaction data is indicative of an action such as picking or placing an item at a particular location on the fixture, touching an item at a particular location on the fixture, presence of the user at the fixture without touching the item, and so forth. For example, the inventory management system may use the sensor data to generate tracking data and interaction data that determines a type of item a user picked from a particular fixture.

A fixture may include one or more item stowage areas such as shelves, hangers, and so forth, that hold or otherwise support a type of item. The fixture may be arranged into sections, such as lanes on a shelf. For example, a shelf may have three lanes, with each lane holding a different type of item. Items may be added to (placed) or removed (picked) from the fixture, moved from one fixture to another, and so forth.

The floor of the facility may comprise a plurality of smart floor tiles. The smart floor tiles may include transmitters that generate low frequency radio signals and a receiver that detects the low frequency radio signals. For example, the carrier of these signals may be less than or equal to 30 MHz. The smart floor tiles may also include sensors such as touch or pressure sensors that provide object data indicative of an object such as a foot or wheel that is in contact with the smart floor tile.

The floor of the facility is composed of clusters of smart floor files. Each cluster includes a plurality of smart floor tiles. Each smart floor tile, in turn, has a plurality of segments. During operation, the transmitters of the smart floor tiles may be configured to transmit several signals. Each smart floor tile transmits a tile signal at a particular tile frequency. Within the cluster, each smart floor tile transmits on a different frequency. The same tile frequencies may be reused by other smart floor tiles in another cluster.

Each segment of the smart floor tile transmits a segment signal at a particular segment frequency. Each segment signal within a given smart floor tile is transmitted at a different frequency. The same segment frequencies may be reused by other smart floor tiles in the cluster. Each segment includes at least one antenna that radiates the segment signal assigned to that segment. The tile signal may be transmitted using one or more of the antennas at the different segments.

An object may electromagnetically couple to a proximate antenna in the smart floor tile. For example, when a user is standing with their left foot on a first segment in a first smart floor tile, their left foot electromagnetically couples to the antenna in that segment. As a result of this coupling, a first set of the signals transmitted by the first segment are transferred along the body of the user by way of this electromagnetic coupling. Continuing the example, the tile signal and the segment signal are propagated along the body of the user standing on that segment to the other extremities such as the right foot and both hands.

As the user walks, their right foot comes to rest on a second smart floor tile. The body of the user now acts as a bridge, providing a signal path along which signals may travel between the first and second smart floor tiles. A receiver in the second smart floor tile detects the first set of signals that originated by the first smart floor tile under the left foot. Meanwhile, the reverse happens with the first smart floor tile detecting a second set of signals that originate from the second smart floor tile and are passed from the right foot through the user's body to the left foot.

The smart floor tiles may generate tile output data that includes received characteristic data. The received characteristic data provides information about the signals received and may include the received signal strength of those signals. The tile output data from the first and second smart floor tiles may be used to determine that the user is in contact with both tiles. For example, a server may receive the tile output data and determine that these two smart floor tiles and their respective segments are reporting received characteristic data indicative of the other smart floor tile. Given this correspondence, the two locations of the received characteristic data may be associated with the feet of a single user, and a location of the user may be determined. The server may also analyze the received characteristic data obtained from several segments and estimate a shape of a user's foot.

By determining a successive series of locations of the user over time, tracking data may be generated. The tracking data comprises information indicative of the user's path through the facility.

The signals provided by the transmitters may be used to determine the relative position of the user's hand(s) with respect to a fixture, to determine an item interacting with a location, and so forth. For example, a smart floor tile may transmit the signals that are then conducted through the user and detected using antennas arranged along a shelf that are connected to one or more receivers. By using the relative signal strength at the different antennas and the known position of the antennas, a position of the user's hand may be determined with respect to the shelf. When the user touches an item stored on the shelf, the signals transfer from the user to the item and from there transfer to the shelf. For example, the amplitude of the electromagnetic signal received at an antenna that is located beneath the item that is being touched may increase significantly relative to the level obtained when there is no contact. As a result of this increase, the user may be deemed to have had contact with the item stored at that location on the shelf.

Information about which user is interacting with the fixture, touching an item, and so forth, may be determined by analyzing the particular combination of signals that are received. For example, the receiver of the shelf may generate characteristic data for the signal received at the shelf. This characteristic data may be compared with the tile output data described above to determine which user is in contact with the particular smart floor tiles and segments. This contact produces a characteristic pattern of signals that corresponds the received characteristic data for the signal received at the shelf. In some implementations, the characteristic data may be obtained using signals received from a subset of the antennas at the shelf. For example, the antennas corresponding to peak received signal strength values that are used to determine the relative position may be used to produce the characteristic data. The spatial diversity between different antennas on the shelf may be used to separate out different hands, and the different characteristics may be used to distinguish one user from another.

By using the techniques described herein, operation of the facility may be improved. Details about interactions between users and items in the facility may be quickly and accurately determined. For example, as items are picked, placed, and so forth, information such as inventory levels based on changes in the count of items at the fixtures may be readily and more accurately determined. As a result, the inventory management system may be able to quickly track what item a user has interacted with, maintain up-to-date inventory information, and so forth. Tracking of users may be facilitated, allowing for enhanced services to the users of the facility, such as making the facility respond to the presence of a user. For example, as an authorized user approaches a fixture holding items that is locked, the fixture may unlock to provide access.

The smart floor tiles provide various technical advantages including, but not limited to, reductions in bandwidth compared to other sensor methodologies, improved tracking of individual users in congested environments, detection of potential hazards, detection of user incapacity, and so forth.

The smart floor tiles are mechanically robust and provide high resolution tracking data for users as well as providing the ability to identify who is interacting with a particular fixture, item, and so forth. The system described herein allows for reduced capital expenditures, as well as reduced operating expenditures relative to other sensor methodologies. For example, compared to vision tracking systems, installation of smart floor tiles is less expensive, and during operation requires fewer computational resources, is less prone to failure or environmental interference, and so forth. The smart floor tiles and the information obtained thereby may be used in conjunction with other systems, such as vision tracking systems, tag tracking systems, and so forth.

The system described herein may be used in other types of facilities, both commercial and non-commercial. For example, the smart floor tiles may be installed within a home or care facility and provide information such as user tracking, if the user is standing, lying on the floor, and so forth. The system may be used to improve user safety by determining the whereabouts of the user, determining if the user has fallen, and so forth. The system may also provide enhanced functionality, such as operating in conjunction with building operation. For example, by tracking the user in the facility, lighting, environmental controls, and so forth, may be controlled based on the location of the user.

Illustrative System

FIG. 1 illustrates a system 100 using a variety of sensors to generate tracking data and other information within a facility, according to some implementations. The facility includes a floor 102. The floor 102 may comprise a plurality of smart floor tiles (SFTs) 104. A group of the SFTs 104 is a cluster. The floor 102 may include a plurality of clusters.

Each of the SFTs 104 may include various components such as antennas, transmitters, receivers, hardware processors, sensors, and so forth. The SFT 104 may itself be subdivided into segments. For example, each segment may comprise a different antenna. The SFT 104 may be configured to transmit and receive electromagnetic signals (EMS) 106. Each segment may transmit at a particular frequency that is different from the other segments in the SFT 104. Each segment may also transmit at a frequency that is different from the other segment frequencies and is different from the other SFTs 104 in the cluster. As a result, within the cluster, a particular SFT 104 may be distinguished by the EMS 106 that it transmits at a particular frequency. The EMS 106 may be transmitted at a low power. For example, the EMS 106 may have a power level of less than 500 microwatts.

These EMS 106 may be propagated by the body of a user. For example, the EMS 106 may be propagated along the skin or clothing of the user, travelling from one SFT 104 to another, or from one SFT 104 to another device such as the fixtures 108. Each SFT 104 may transmit several signals, each at different frequencies. The transmissions may be continuous or may be made at particular times. The different types of signals that may be transmitted are discussed in more detail below with regard to FIG. 2. The SFT 104 is discussed in more detail below with regard to FIG. 3.

Within the facility may be one or more fixtures 108. The fixture 108 may include shelves, hangers, and so forth, that hold or otherwise support a type of item. The fixture 108 may be arranged into sections, such as lanes on a shelf. For example, a shelf may have three lanes, with each lane holding a different type of item. Items may be added to (placed) or removed (picked) from the fixture 108, moved from one fixture 108 to another, and so forth. In some implementations, the SFTs 104 may be installed, and the fixtures 108 and other objects may then be installed on the SFTs 104. In other implementations, the fixtures 108 may be installed and then the SFTs 104 may be installed around the fixtures 108. Some portions of the floor 102 may omit SFTs 104. For example, SFTs 104 may be omitted from around the perimeter of a room, immediately adjacent to a wall, underneath a fixture 108, and so forth.

An entry 110 provides access for a user 112 to the facility. For example, the entry 110 may comprise a foyer, door, gated entry area, and so forth. In some implementations, an identity of the user 112 may be asserted at the entry. For example, the user 112 may provide identification credentials such as swiping a card, carrying a device that transmits or displays authentication credentials, and so forth. The user 112 may move throughout the facility, with movement depicted in this illustration as a user path 114 across the floor 102. The user 112 may use various tools while in the facility, such as a tote 116, pallet jack, and so forth. The tote 116 may include a basket, cart, bin, bag, and so forth. During operation of the facility, users 112 thus move around, picking, placing, or otherwise interacting with items at the fixtures 108.

The SFTs 104 may obtain electrical power from a power supply 118. For example, the power supply 118 may provide 24 volts direct current (VDC) to one or more of the SFTs 104. The power supply 118 may be configured to obtain power from building mains and then provide conditioned power for use. The SFTs 104 are connected to a network 120. The network 120 allows for communication between SFTs 104 and other devices, such as described below.

A clock 122 may provide a clock signal 124 or other clock data that is transmitted to the SFTs 104 using the network 120. In some implementations, the clock signal 124 may be distributed via another mechanism, such as by the power supply 118 by way of a power distribution network. For example, the clock signal 124 may be overlaid as an alternating current signal along one or more of the electrical conductors used to supply direct current power to the SFTs 104. In some implementations, the clock signal 124 may be omitted, with each SFT 104 operating with independent clocks 122 or "free running".

One or more processors of the SFTs 104 may generate tile output data 126. The tile output data 126 may include characteristic data 128. The characteristic data 128 is indicative of a plurality of signals, each at different frequencies, and the received signal strength of the signals at each of the different frequencies. The characteristic data 128 is indicative of a particular SFT 104 and one or more segments of the SFT 104. The tile output data 126 may include information about the SFT 104 itself and the segments thereon that received the signals that are represented by the characteristic data 128. For example, the tile output data 126 may comprise characteristic data 128 for the EMS 106 received at each segment.

During operation a first foot of the user 112 is in contact with a first SFT 104(1). The particular mix of EMS 106 transmitted by the first SFT 104(1) is electromagnetically coupled to the body of the user 112 and transferred along a signal path that includes the body of the user 112 from the first foot to the second foot of the user 112. Meanwhile, a first receiver in the first SFT 104(1) is listening for EMS 106. As the second foot comes into contact with a second SFT 104(2), a bidirectional exchange of EMS 106 takes place. The first SFT 104(1) transmits a first set of EMS 106(1) (at a first tile frequency and one or more segment frequencies), which is received by a receiver of the second SFT 104(2). Meanwhile, the second SFT 104(2) transmits a second set of EMS 106(2) (at a second tile frequency and one or more segment frequencies), which is received by a receiver of the first SFT 104(1).

As the user 112 walks across the floor 102, they act as a bridge between successive SFTs 104, resulting in a trail of pairs of SFTs 104 (or the segments therein) that have been trod upon. Tile output data 126 may be generated that is indicative of the identity of the receiving SFT 104 and the characteristic data 128 indicative of the EMS 106 that were received. The tile output data 126 may be transferred from the SFT 104 in the floor 102 to an inventory management system 130 via the network 120. Other information, such as the fixture data 132, may also be provided to the inventory management system 130.

The inventory management system 130 may include a tracking module 134. The tracking module 134 may use one or more of the tile output data 126 or the fixture data 132 to generate tracking data 136. The tracking data 136 may include one or more of information indicative of the user path 114 within the facility, current location, location at a particular time, and so forth. In some implementations, the tracking module 134 may be executed as a tracking system, such as provided by one or more computing devices. In some implementations, the tracking module 134 may use the characteristic data 128 to further distinguish between users 112 or other objects. For example, the user 112, tote 116, or other object may include a transmitter that emits a discrete EMS 106 or a receiver that receives the EMS 106 and provides characteristic data 128. In some implementations, the distribution of received EMS 106 signal amplitude with respect to feet (such as greater signal strength at the toe than the heel) may be used to determine an approximate shape of the foot that is indicative of a particular user 112 or other object to be tracked. This data may be used instead of, or in conjunction with, the characteristic data 128 to generate the tracking data 136.

An analysis module 138 may use the tracking data 136 to generate group data 140. The group data 140 may comprise information that associates a plurality of users 112 as belonging to a common group or having a common affiliation. For example, members of a family within the facility may be deemed to be a group, members of the same picking crew may be members of a group, and so forth. In some implementations, the tile output data 126 may be processed to determine the group data 140. For example, several users 112 may be holding hands or otherwise in physical contact with one another. As a result of this contact, the EMS 106 from a first SFT 104(1) may be transferred through those users 112 to the receivers of the SFTs 104 beneath each of the other members of the group. By determining the presence of a plurality of users 112, such as by multiple footprints detected by the sensors within the SFTs 104 that share a common EMS 106 encoding of the same characteristic data 128, group data 140 may be determined.

The analysis module 138 may also generate interaction data 142. The interaction data 142 is indicative of an action such as picking or placing an item at a particular fixture 108, approaching but not touching an item stowed at the fixture 108, presence of the user 112 at the fixture 108, and so forth. For example, the analysis module 138 may use tracking data 136 to determine that a particular user 112 was in front of a particular fixture 108 at a time when that fixture 108 experienced a change in quantity of items stowed therein. Based on this correspondence, a particular user 112 may be associated with that change in quantity, and interaction data 142 indicative of this may be generated.

The analysis module 138 may also use the fixture data 132 or other data obtained from one or more sensors or other devices located at or near the fixture 108 to generate the interaction data 142. In one implementation, the fixture 108 may include one or more receivers that are able to receive the EMS 106. As the user 112 comes into contact with the item stowed at the fixture 108, their body and the item itself provide a pathway for the EMS 106 to be transferred to an antenna located at the fixture 108. As a result, use of the SFT 104 and the EMS 106 provides the additional benefit of unambiguously identifying an item that the particular user 112 interacted with. The analysis module 138 is configured to generate the interaction data 142 based on inputs including, but not limited to, the tile output data 126, the fixture 108, and so forth.

While FIG. 1 depicts the floor 102 as being completely covered with SFTs 104, in some implementations, only a portion of the floor 102 may include SFTs 104. For example, SFTs 104 may be placed down an aisle and not underneath the fixtures 108. In another example, the SFTs 104 may be deployed in front of the fixtures 108.

The inventory management system 130 may access data from other sensors within the facility. For example, image data may be obtained from a plurality of cameras located within the facility. Various image processing techniques may be used, such as object recognition, blob tracking, and so forth, to generate information from this image data. In some implementations, the image data may be processed by human operators. For example, a human operator may be presented with images as well as tracking data 136 to resolve an ambiguity or loss of tracking.

Figure 2:
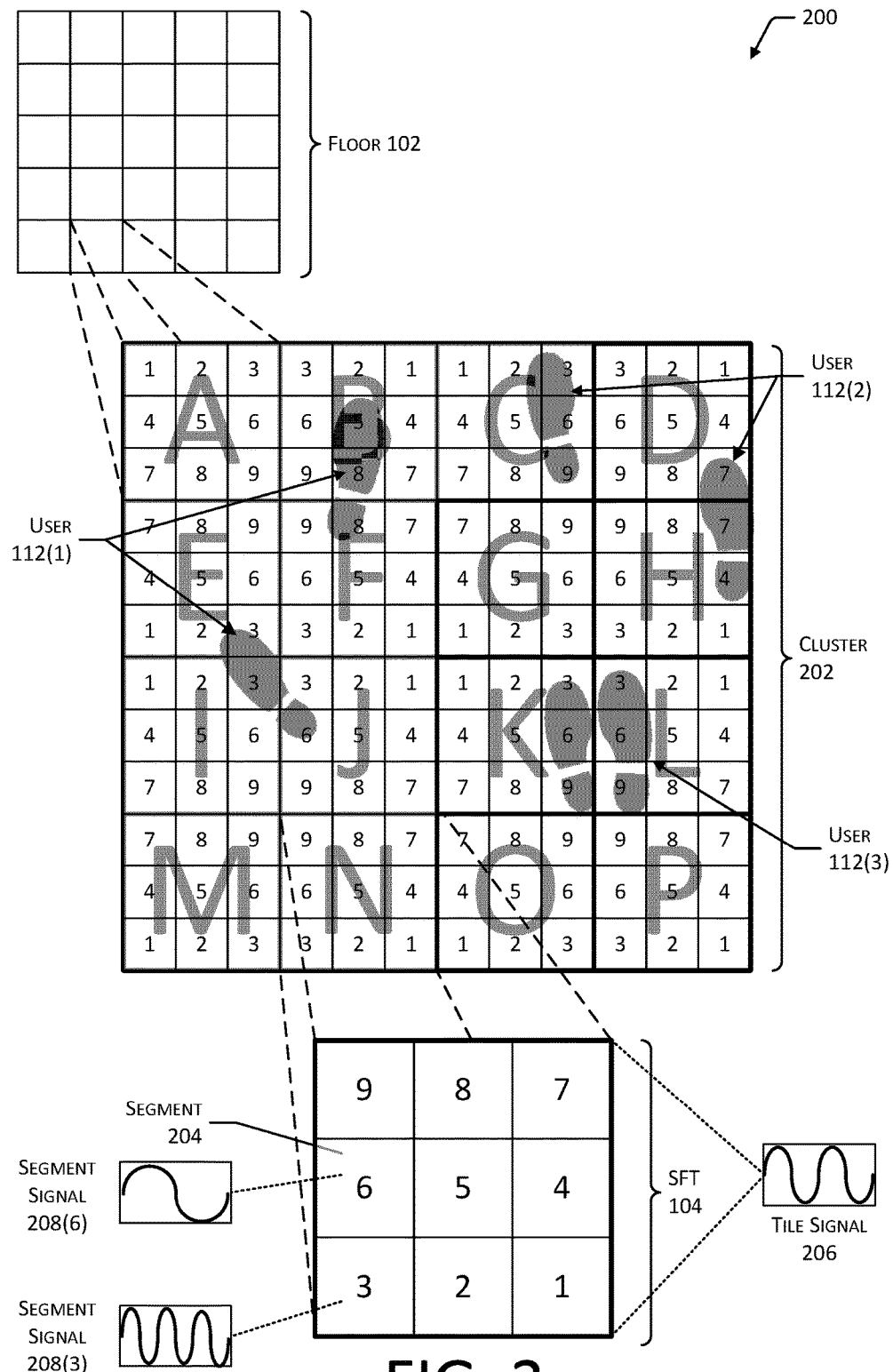
FIG. 2 illustrates an arrangement of smart floors tiles and their respective segments, according to some implementations.

FIG. 2 illustrates an arrangement 200 of SFTs 104 and their respective segments, according to some implementations.

A portion of the floor 102 is depicted which is made up of several clusters 202. A cluster 202 is a grouping of SFTs 104. For example, the portion of the floor 102 depicted here includes 25 clusters 202, each cluster 202 including 16 SFTs 104. Each SFT 104 in turn may include one or more segments 204. Continuing the example depicted here, each SFT 104 includes nine segments. In other implementations, the cluster 202 may include different numbers of SFTs 104, each SFT 104 may include different numbers of segments 204, and so forth.

In some implementations, segments 204 may comprise portions of a SFT 104 or may be discrete devices that are joined together to form a SFT 104. For example, the segments 204 may be connected to one another, a backplane, wiring harness, and so forth, to form a SFT 104.

The physical size of a cluster 202 may be determined in some implementations based on a maximum expected stride length of a user 112. For example, a user 112 may be expected to have a stride length that is less than 3 feet while walking. If the SFTs 104 are 1 foot on each side, then the cluster 202 depicted here is 4 feet by 4 feet. Likewise, each segment 204 is 4 inches by 4 inches. In other implementations, other sizes of segments 204, SFTs 104, and clusters 202 may be used. Also, other shapes of segments 204, SFTs 104, and clusters 202 may be used. For example, the segments 204 may be triangular shaped, SFTs 104 may be rectangular, and so forth.

The SFT 104 transmits a tile signal 206 and one or more segment signals 208. Together, these signals comprise the EMS 106 emitted by the SFT 104. The tile signal 206 is transmitted at a first frequency that is representative of that particular SFT 104 within a particular cluster 202. The segment signal 208 is transmitted at a second frequency that is different from the first and is representative of the particular segment 204 within a particular SFT 104.

In this illustration, the particular frequency of a particular tile signal 206 is represented by a letter, such as "A", "B", "C", and so forth, while the frequency of the segment signal 208 is represented by a number "1", "2", "3", and so forth. For example, the tile frequencies 206 may begin at 40 kHz with 1 kHz spacing, resulting in "A" representing 40 kHz, "B" representing 41 kHz, "C" representing 42 kHz, and so forth. Continuing the example, the segment signals 208 may begin at 50 kHz with 1 kHz spacing, resulting in "1" representing 50 kHz, "2" representing 51 kHz, and so forth. This notation and these frequencies are provided by way of illustration and not necessarily as limitations.

The EMS 106 as emitted may exhibit sinusoidal waveforms. In other implementations, other waveforms such as square, triangle, sawtooth, and so forth, may be used. Use of sinusoidal waveforms may allow for reduced channel spacing and minimize adjacent channel interference. The EMS 106 may be transmitted at fixed carrier frequencies of between 20 kilohertz and 15 megahertz. In other implementations, other frequencies may be used.

In some implementations, each SFT 104 may utilize the same spatial arrangement of segments 204. For example, the SFTs 104 in the floor 102 may have the same arrangement of segments 204, such as beginning at the top left of the SFT 104 with segment 1 and increasing from left to right and into subsequent rows, such as in SFT 104(A).

In other implementations, such as depicted here, the SFTs 104 may be arranged such that adjacent segments 204 of adjacent SFTs 104 use the same frequencies. For example, the SFTs 104 may be arranged such that a first physical arrangement of segments 204 and their respective segment signal 208 frequencies for a first SFT 104(A) are mirrored in a second SFT 104(B) that is adjacent to the first SFT 104(A). In this configuration, immediately adjacent segments 204 utilize the same segment signal 208 frequencies. Continuing the example, SFT 104(A)'s upper rightmost segment 204 is using segment signal 208 frequency "3", while SFT 104(B)'s upper leftmost segment 204 that is immediately adjacent is also using segment signal 208 frequency "3".

Use of this mirrored arrangement may improve performance of the system by producing an increase in the total amplitude of the segment signals 208 in situations where a user 112 or other object has a foot in contact with two different SFTs 104. This arrangement may also provide additional benefits with regard to computing the location of an object, such as the position of the feet of the users 112.

In this illustration, three users 112 are depicted. The left foot of user 112(1) is above the following SFTs 104 and their respective segments: 104(E)(2), 104(E)(3), 104(I)(2), 104(I)(3), 104(I)(6), 104(J)(3), and 104(J)(6). The right foot of user 112(1) is above the following SFTs 104 and their respective segments: 104(B)(5), 104(B)(8), 104(F)(8), and 104(F)(9). Also shown are the feet of users 112(2) and 112(3) at other locations within the cluster 202. A representation of the characteristic data 128 associated with the first user 112(1) is depicted below with regard to FIG. 5, while the characteristic data 128 associated with the second user 112(2) is depicted below with regard to FIG. 6.

The SFTs 104 may be configurable, such that they may be installed and then configured to provide a particular segment signal 208 at a particular frequency after physical installation of the SFT 104. For example, SFT 104(A) may be electronically switched to provide segment signals 208 in the pattern shown with SFT 104(P).

Figure 3:
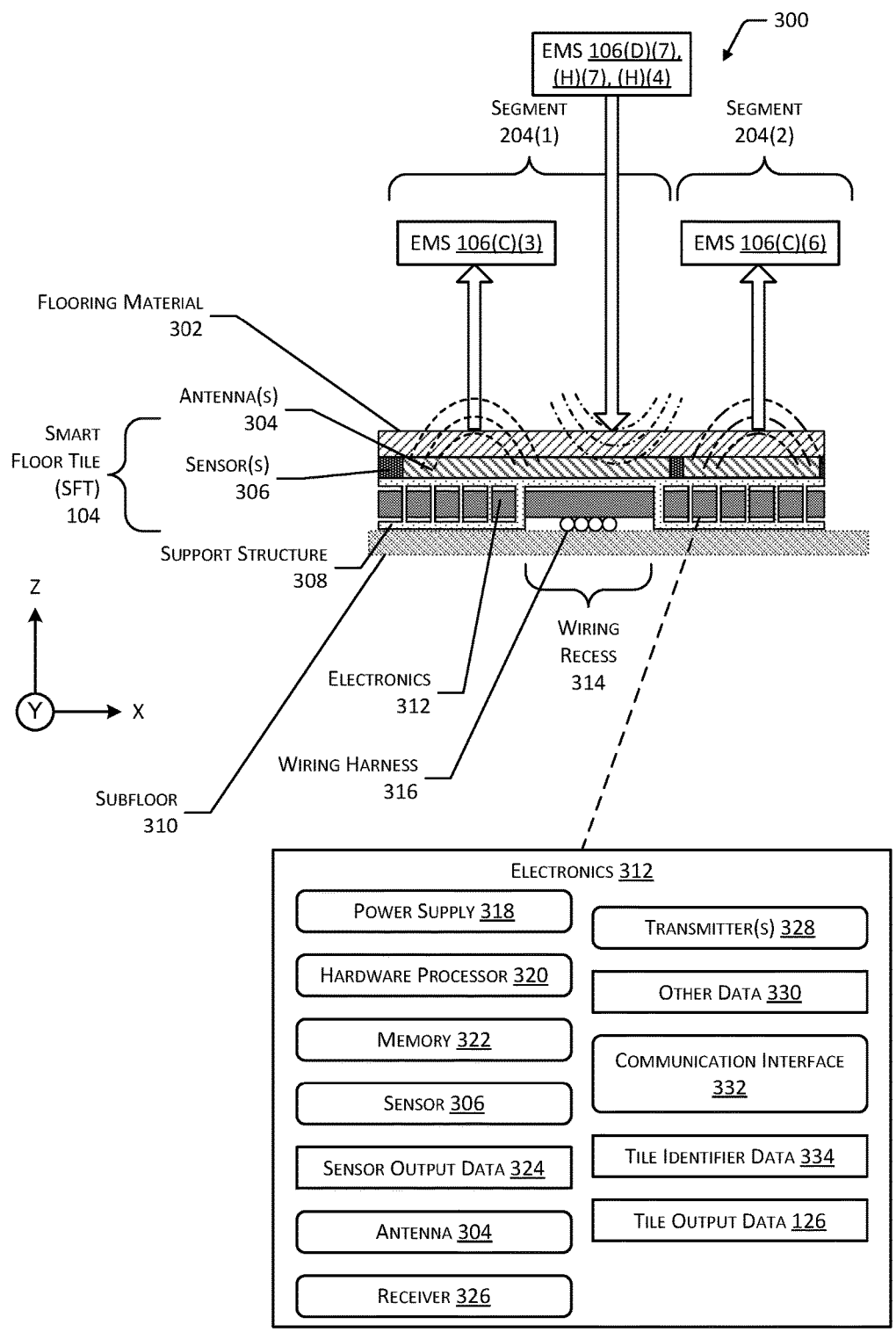
FIG. 3 illustrates the arrangement of components included in a smart floor tile, according to some implementations.

FIG. 3 illustrates the arrangement 300 of components included in a SFT 104, according to some implementations. A side view of a portion of the SFT 104 depicts a top layer comprising a protective material, such as flooring material 302. The flooring material 302 is electrically non-conductive under ordinary conditions. For example, the flooring material 302 may include plastic, ceramic, wood, textile, or other material. Beneath a layer of flooring material 302 may be one or more antennas 304 and one or more sensors 306. The antennas 304 may comprise structures designed to accept or emit radio frequency energy. In some implementations, the antennas 304 may also serve as the flooring material 302. For example, the antennas 304 may comprise aluminum or steel sheets upon which the users 112 walk. The active portion of the antenna 304 comprises that portion of the antenna 304 that is used to radiate or receive an EMS 106.

The SFT 104 may include a plurality of antennas 304. For example, the antennas 304 may be arranged to form an array. In some implementations, the active portion of the antennas 304 may have a surface area that occupies at least 1 square inch. Each segment 204 includes at least one segment antenna 304. The segment antenna 304 of the segment 204 may be the same size as the segment 204 or may be smaller. For example, the segment 204 may be 4 inches by 4 inches square, but the segment antenna 304 in that segment 204 may only be 2 inches by 2 inches square. In another example, the segment 204 may be 4 inches by 4 inches square and the segment antenna 304 in that segment 204 may be 4 inches by 4 inches square. In one implementation, antennas 304 may be shared, with a single antenna being used to both transmit and receive simultaneously or at different times. In another implementation, separate antennas 304 may be used to transmit and receive.

The SFT 104 may also include a plurality of sensors 306, and the sensors 306 may also be arranged to form an array. For example, the sensors 306 may include weight sensors that measure the weight applied to a particular segment 204. The sensors 306 provide sensor output data. The arrangement of these two arrays may differ from one another. In some implementations, the sensors 306 may include a magnetometer that provides information about local magnetic fields.

As illustrated here, the antennas 304 may be located within a common plane. In other implementations, the antennas 304 may be arranged within a layer that is above the sensors 306, below the sensors 306, and so forth. A load bearing support structure 308 may be beneath the sensors 306 and the antennas 304 and provides mechanical and physical separation between the underlying subfloor 310 upon which the SFT 104 rests and the flooring material 302. The support structure 308 may comprise a series of pillars, posts, ribs, or other vertical elements. The support structure 308 may comprise a composite material, plastic, ceramic, metal, or other material. In some implementations, the support structure 308 may be omitted, and electronics 312 or structures associated with the electronics 312 may be used to support a load on the flooring material 302. For example, the electronics 312 may comprise a glass fiber circuit board that provides mechanical support while also providing a surface for mounting the electronics 312. The subfloor 310 may comprise concrete, plywood, or existing flooring materials over which the SFT 104 is installed. In some implementations, the SFT 104 may be affixed to the subfloor 310, or may be unaffixed or "floating". For example, the SFT 104 may be adhered to the subfloor 310 using a pressure sensitive adhesive.

The SFT 104 includes the electronics 312. The electronics 312 may include the elements described elsewhere in more detail. In the implementation depicted here, electronics 312 are arranged within the support structure 308. In some implementations, one or more of the antennas 304 or the sensors 306 may be located within the support structure 308. The support structure 308 may operate as a heat sink to dissipate heat generated by operation of the electronics 312.

The SFT 104 may incorporate a wiring recess 314 on an underside of the SFT 104. For example, the support structure 308 and the electronics 312 may be formed or arranged to provide a pathway for a wiring harness 316 to pass beneath at least a portion of the SFT 104. The wiring recess 314 may extend from one edge of the SFT 104 to another, may extend in different directions, and so forth. For example, the wiring recess 314 may be arranged in a "+" or cross shape, allowing for wiring harnesses 316 to pass along the X or Y axes as depicted here.

The wiring harness 316 may provide a coupling to one or more of the power supply 118, the network 120, and so forth. For example, the wiring harness 316 may include conductors that allow for the SFT 104 to receive electrical power from an electrical distribution network, allow for connection to a Controller Area Network (CAN) bus network that services a cluster 202 of SFTs 104, and so forth. The wiring harness 316 may include electrical conductors, electromagnetic waveguides, fiber optics, and so forth. In some implementations, a plurality of wiring harnesses 316 may be used. For example, a first wiring harness 316(1) may provide electrical power while a second wiring harness 316(2) provides network connectivity. In some implementations, the wiring harness 316 may be used to provide information used to determine a relative arrangement of SFTs 104.

The electronics 312 of the SFT 104 may include a power supply 318. The power supply 318 may include an electric power interface that allows for coupling to the power supply 118. For example, the electrical power interface may comprise connectors, voltage converters, frequency converters, and so forth. The power supply 318 may include circuitry that is configured to provide monitoring or other information with regard to the consumption of electrical power by the other electrical power components of the SFT 104. For example, the power supply 318 may include power conditioning circuitry, DC to DC converters, current limiting devices, current measurement devices, voltage measurement devices, and so forth. In some implementations, the SFT 104 may be configured to connect to redundant power buses. For example, a first electrical distribution network such as an "A" bus and a second electrical distribution network such as a "B" bus may be provided, each of which can provide sufficient electrical power for operation. In some implementations, the SFT 104 may incorporate redundant power supplies 318.

The SFT 104 may include one or more hardware processors 320. Hardware processors 320 may include microprocessors, microcontrollers, systems on a chip (SoC), field programmable gate arrays (FPGAs), and so forth. The SFT 104 may also include one or more memories 322. The memory 322 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 322 provides storage of computer-readable instructions, data structures, program modules, and other data for the operation of the SFT 104.

The SFT 104 may include sensor electronics 312. The sensor electronics 312 may be configured to acquire information from sensors 306. In one implementation, the sensors 306 may comprise electrodes or other electrically conductive elements that are used as part of a capacitive sensor array. In one implementation, the electrodes may be arranged in an array. Each electrode may be rectangular with a first side and a second side, with the length of the first side and the second side being between 10 millimeters and 50 millimeters. In other implementations, other shapes and sizes may be used.

The sensor electronics 312 may include capacitive measurement circuitry that generates capacitance data. The capacitance measurement circuitry may use various techniques to determine capacitance. For example, the capacitance measurement circuitry may include a source that provides a predetermined voltage, a timer, and circuitry to measure voltage of the conductive element relative to the ground. By determining an amount of time that it takes to charge the conductive element to a particular voltage, the capacitance may be calculated. The capacitance measurement circuitry may use one or more of analog or digital circuits to determine capacitance. During operation, the capacitive sensor uses a conductive element located beneath the flooring material 302 to produce capacitance data indicating capacitance values at particular times. Based on the capacitance data, information such as a presence of an object, shape of an object, and so forth, may be generated to produce sensor output data 324. The sensor electronics 312 may be configured to scan the sensors 306 and generate sensor output data 324 at least 30 times per second. The sensor output data 324 may include information about proximity of an object with respect to a particular electrode. The sensor output data 324 may be further processed to generate the other data 330.

In other implementations, the sensors 306 may comprise optical touch sensors comprising one or more illuminators and one or more photodetector elements, resistive touch sensors comprising electrically resistive material, acoustic touch sensors comprising one or more transducers, and so forth. The sensors 306 may include other sensors, such as weight sensors, moisture detectors, microphones, and so forth.

The SFT 104 may include a receiver 326. The receiver 326 is configured to detect the EMS 106. The receiver 326 may be implemented as discrete circuitry, as a software defined radio (SDR), and so forth. The receiver 326 is coupled to one or more of the antennas 304. In some implementations, a single receiver 326 may be coupled to a single antenna 304. In other implementations, a single receiver 326 may be coupled to a plurality of antennas 304 by way of switching circuitry, matching network, and so forth. The switching circuitry may allow the selective connection of a particular antenna 304 to the receiver 326. The receiver 326 may be configured to detect the EMS 106 at a particular frequency and generate information indicative of a received signal strength.

In some implementations, elements of the sensors 306 may be combined or used in conjunction with the antennas 304. For example, electrically conductive elements may be used for both capacitive sensing by the sensor 306 and as antennas 304. This dual use may occur at the same time or may be multiplexed over time. For example, switching circuitry may, at a first time, selectively connect the sensor electronics 312 to the electrically conductive element for use as a capacitive sensor pad. The switching circuitry may then selectively connect, at a second time, the receiver 326 to the same electrically conductive element for use as an antenna 304.

The EMS 106 is acquired by the antenna 304 and then provided to the receiver 326. For example, the receiver 326 may comprise a superheterodyne receiver, with an incoming radio signal being converted to an intermediate frequency by a mixer. At the intermediate frequency stage, the downconverted signal is amplified and filtered before being fed to a demodulator. One or more antennas 304 may be dedicated for use by the receiver 326, while one or more other antennas 304 may be dedicated for use by the transmitter(s) 328. The use of separate antennas to transmit and receive may improve isolation between the receiver 326 and the transmitter 328. The receiver 326 or the hardware processor 320 processes the EMS 106 to determine the characteristic data 128, such as a received frequency and the signal strength received at that frequency. In another implementation, the receiver 326 may comprise a SDR.

In some implementations, the EMS 106 may encode data. The receiver 326 or the hardware processor 320 decode, decrypt, or otherwise demodulate and process the demodulated signal to determine the characteristic data 128. For example, the receiver 326 may provide as output the digital representation of a signal that incorporates binary phase shift keying (BPSK). The hardware processor 320 may process this digital representation to recover a serial data stream that includes framing, error control data, payload, and other information. The payload may then be processed to produce output. The error control data may include error detection data such as parity check data, parity bits, hash values, and so forth. For example, a hash function may be applied to the characteristic data 128 to generate hash output. A comparison of the hash output may be made to determine if an error is present.

The SFT 104 includes one or more transmitters 328. For example, the transmitter 328 may comprise a voltage controlled oscillator that generates an output signal that is fed directly to a power amplifier. The transmitter 328 couples to an antenna 304, which then radiates the EMS 106. The transmitter 328 may be implemented as discrete circuitry, SDR, or combination thereof.

The transmitter 328 may accept multiple signals to generate the EMS 106 that is emitted from an antenna 304 connected to the transmitters 328 output. For example, a mixer may be used to combine a tile signal 206 with a segment signal 208 to produce the EMS 106 that is transmitted from a particular segment 204 of the SFT 104. In some implementations, each segment 204 may utilize a single transmitter 328 that produces an EMS 106 that includes at least the segment signal 208. In other implementations, a single transmitter 328 may be used to generate all of the EMS 106 from a given SFT 104. For example, the transmitter 328 may generate the tile signal 206 and all the respective segment signals 208 for that SFT 104. Filters may be used on the output such that the antenna 304 at a particular segment 204 emits only the desired tile signal 206 and the segment signal 208 for that particular segment 204.

The transmitter 328 may be configured to produce a phase modulated output signal. The transmitters 328 for the SFTs 104 in a given floor 102 may operate on a single frequency, or may be frequency agile and operate on a plurality of different frequencies. For example, a single transmitter 328 may generate, at different times, the tile signal 206 and the segment signals 208, transitioning in rapid succession between producing signals at these different frequencies. In some implementations, the receiver 326 and the transmitter 328 may be combined or share one or more components. For example, the receiver 326 and the transmitter 328 may share a common oscillator or frequency synthesizer.

In some implementations, a single antenna 304 may be used to both transmit and receive. For example, the receiver 326 may include notch filters to attenuate the frequencies of the transmitted tile signal 206 and the transmitted segment signal 208 for that segment 204. A single antenna 304 may also be used to transmit different signals. For example, a single antenna 304 may be used to transmit the tile signal 206 and a segment signal 208. In some implementations, a diplexer may be used that accepts input from two or more transmitters 328 and provides output of the EMS 106 to an antenna 304 or group of antennas 304. In other implementations, the diplexer or other filtering may be omitted and one or more transmitters 328 may be coupled to a single antenna 304 or group of antennas 304.

The hardware processor 320 may acquire data from one or more of the sensors 306, the receiver 326, transmitter 328, and so forth, to generate other data 330. The other data 330 comprises information about an object that is resting on or proximate to the flooring material 302. The information may be indicative of a shape of the object. In some implementations, the other data 330 may comprise information that is representative of the contours of an object. For example, the other data 330 may comprise a bitmap representative of the output from a plurality of sensors 306 and indicative of their relative arrangement. In another example, the other data 330 may comprise a vector value that is indicative of polygons used to represent an outline of an object. In some implementations, the other data 330 may be indicative of an area of the object. For example, the other data 330 may indicate that the total area of an object is 48 square centimeters. The other data 330 may include other information such as information about amplitude of a received EMS 106 with respect to different portions of the object. For example, other data 330 may be generated that indicates the shape of the object with information about amplitude, frequency, or other details about the EMS 106 at particular points or areas within that shape.

In some implementations, one or more of the receiver 326 or the transmitter 328 may be used to generate the sensor output data 324. For example, sensors 306 may communicate with the power supply 318 to determine the amount of electrical current that is being drawn at a particular time by the transmitter 328. As the electrical coupling between an object above the SFT 104 and one or more of the antennas 304 changes, one or more operating characteristics of the devices in the SFT 104 may change. For example, the impedance of the antenna 304 may experience change. Changes in the impedance may result in a change in the power output of the transmitter 328 during operation. For example, the transmitter 328 may exhibit an impedance mismatch with the antenna 304 in the presence of an object, such as a foot. This impedance mismatch may result in reduced power consumption by the radio frequency amplifier of the transmitter 328. Information about changes in the operational characteristics, such as a change in current draw by the transmitter 328, may be processed to determine the presence or absence of an object with respect to the antennas 304. The operating characteristics may include, but are not limited to: received signal strength at the receiver 326, power consumption of the transmitter 328, radio frequency power output of the transmitter 328, impedance presented at an antenna 304, standing wave ratio (SWR), and so forth. For example, the impedance of the antenna 304 may be measured at a radio frequency input to the receiver 326, a radio frequency output of the transmitter 328, and so forth. In another example, the SWR presented by one or more of the antennas 304 may be similarly measured. In other implementations, other operating characteristics may be used. For example, a change in the noise detected by the receiver 326 may be used to determine presence or absence of an object. In yet another implementation, the transmitter 328 of the SFT 104 may generate a signal that is then received by the receiver 326 of the same SFT 104. A change in the received signal at a particular antenna 304 may be used to determine the presence of an object. In still another implementation, the EMS 106 received from the other SFT 104 may be measured, and the received signal strength at particular segments 204 may be used to generate information indicative of the presence of an object.

By combining information from a plurality of antennas 304, other data 330 may be generated. In other implementations, other characteristics of the receiver 326 or the transmitter 328 may be assessed to generate the other data 330 or other information indicative of proximity of an object to the antenna 304. For example, the change in impedance may be measured, a change in background noise level may be measured, and so forth. In some implementations, radio ranging may be utilized in which the transmitter 328 emits a pulse and the receiver 326 listens for a return or echo of that pulse. Data indicative of proximity from several antennas 304 may then be processed to generate the other data 330. In another implementation, distance between the object and the antenna 304 may be determined using the amplitude of the received EMS 106. For example, a lookup table may be used that associates a particular received signal strength with a particular distance from the antenna 304.

The communication interface 332 connects the SFT 104 to the network 120. For example, the communication interface 332 may be able to connect to one or more of a Controller Area Network (CAN bus), Inter-Integrated Circuit (I2C), Serial Peripheral Interface bus (SPI), 1-Wire bus, Universal Serial Bus (USB) as promulgated by the USB Implementers Forum, RS-232, Ethernet, Wi-Fi, Bluetooth, and so forth. The communication may be facilitated by data connectors, such as optical connectors, electrical connectors, and so forth. The data connectors provide a pathway for signals to be exchanged between the communication interface 332 and the network 120.

The SFT 104 may include non-transitory computer readable media that is used to store instructions, data, and so forth. Tile identifier data 334 comprises information indicative of a particular SFT 104. The tile identifier data 334 may be unique within the particular network 120, the facility, unique across the production of all SFTs 104 manufactured, and so forth. In some implementations, a media access control (MAC) address, network address, bus address, and so forth, that is associated with the communication interface 332 may be used as tile identifier data 334.

During operation, the hardware processor 320 may generate tile output data 126. As described above, the tile output data 126 may include the characteristic data 128. In some implementations, the tile output data 126 may indicate the characteristic data 128 that was received by the SFT 104, the particular antennas 304 or segments 204 associated with that reception, information about the frequencies of EMS 106 that are being transmitted, and so forth. The tile output data 126 may also include the tile identifier data 334, timestamp data, and so forth. For example, the timestamp data included in the tile output data 126 may indicate when the characteristic data 128 was received by the receiver 326.

The SFT 104 may include multiple hardware processors 320 with different capabilities. For example, individual segments of the sensors 306 may utilize dedicated state machines to perform simple processing functions. These dedicated state machines may then send output data to a microcontroller that provides additional processing to generate sensor output data 324. In one implementation, the dedicated state machine may comprise a complex programmable logic device (CPLD). Continuing the example, a dedicated state machine may provide a 4 bit value indicative of the capacitance measured by a capacitive sensor 306 at a particular segment. The microcontroller may have information that describes a relative arrangement of the sensors 306, and may use this information in conjunction with the dedicated state machine output to generate a bitmap that may be included in the other data 330.

Various techniques may be used to increase the overall uptime of an individual SFT 104, and functionality of the floor 102 as a whole. In one implementation, the SFT 104 may include additional components to provide for failover redundancy. For example, the SFT 104 may include at least two hardware processors 320, each of which is able to generate other data 330, generate tile output data 126, and so forth. In another example, the SFT 104 may include two power supplies 318, each connected to a different bus or power supply 118.

To provide additional redundancy, adjacent SFTs 104 may be connected to different networks 120. For example, an SFT 104 may be connected to a first network 120(1) while the SFT 104 immediately to the right may be connected to a second network 120(2).

The SFT 104 may be configured to perform diagnostics of onboard components, adjacent SFTs 104, and so forth. For example, the SFT 104 may be configured to test the receiver 326 and the transmitter 328 by transmitting a signal from the first antenna 304(1) and listening with the receiver 326 with a second antenna 304(2) that is adjacent to the first antenna 304(1). In some implementations, the SFT 104 may be configured to send diagnostic data using the network 120. For example, diagnostic data may be sent to the inventory management system 130 indicating that a particular SFT 104 has a fault and requires repair or replacement. The SFT 104 may be designed in a modular fashion to allow for repair or replacement without affecting adjacent SFTs 104.

In some implementations, operation of the SFT 104 or the segments 204 therein may be responsive to presence or absence of an object. For example, segments 204 that are proximate to or underneath the object forming a shape may be deemed active segments. Antennas 304 associated with these active segments may be used transmit or receive the EMS 106. Inactive segments comprise segments 204 that are not underneath or proximate to the shape. The determination of whether a segment 204 is active or not may be based at least in part on output from the sensor elements, antennas 304, or other sensors. For example, a segment 204 may be deemed to be an active segment when the associated sensor element exhibits a capacitance value that exceeds a threshold level.

During operation, the determination of which segments 204 are active may be used to determine which antennas 304 are used to one or more of transmit or receive the EMS 106. For example, the antennas 304 beneath inactive segments may be disconnected from receivers 326, or the receivers 326 associated with those antennas 304 may be placed in a low power mode or turned off. As an object is detected by the sensor element as driven using the sensor electronics 312, a particular segment 204 may be designated as an active segment. In this illustration, the active segments are represented with a crosshatch pattern. The antenna 304 and associated radio frequency elements such as the receiver 326 and the transmitter 328 associated with that antenna 304 may be transitioned to an operational mode. Continuing the example, the receiver 326 may begin listening for an EMS 106.

As described above, the SFT 104, or portions thereof such as segments 204, may transition from a receive mode to a transmit mode or vice versa. This transition may be responsive to the detection of an object by the sensor 306. For example, the presence of an object followed by the absence of the object may result in the SFT 104 transitioning from the transmit mode to the receive mode.

By selectively transmitting the EMS 106 using antennas 304 that are within a threshold distance of the shape as determined by the sensors 306, performance of the system may be improved. For example, power consumption may be reduced by transmitting using only those antennas 304 that are proximate to the object producing the shape. In other implementations, the transmitters 328 may be activated on a particular schedule, such as transmitting for 50 milliseconds duration with a gap waiting time of 100 ms before the next transmission. This reduction in duty cycle decreases power consumption.

In some implementations, segments 204 may be in transmit mode while the receiver 326 is still active. For example, the transmitters 328 may transmit while the receiver 326 is listening.

The sensors 306 in the SFT 104 may be used to determine the presence of hazardous conditions at the SFT 104. For example, the sensors 306 may be able to detect a liquid that is present on the flooring material 302 that may comprise a slipping hazard. Continuing the example, a puddle of water on the flooring material 302 may be detected. Information indicative of the puddle may be provided to the inventory management system 130 for mitigation, such as clean up. In another example, the sensors 306 may be able to detect a user 112 lying on the flooring material 302. Upon such detection, an attendant of the facility may be alerted to provide assistance to the user 112. With this example, the floor 102 provides information to the operators the facility that may be used to improve the safety of the facility for the users 112.

Figure 4:
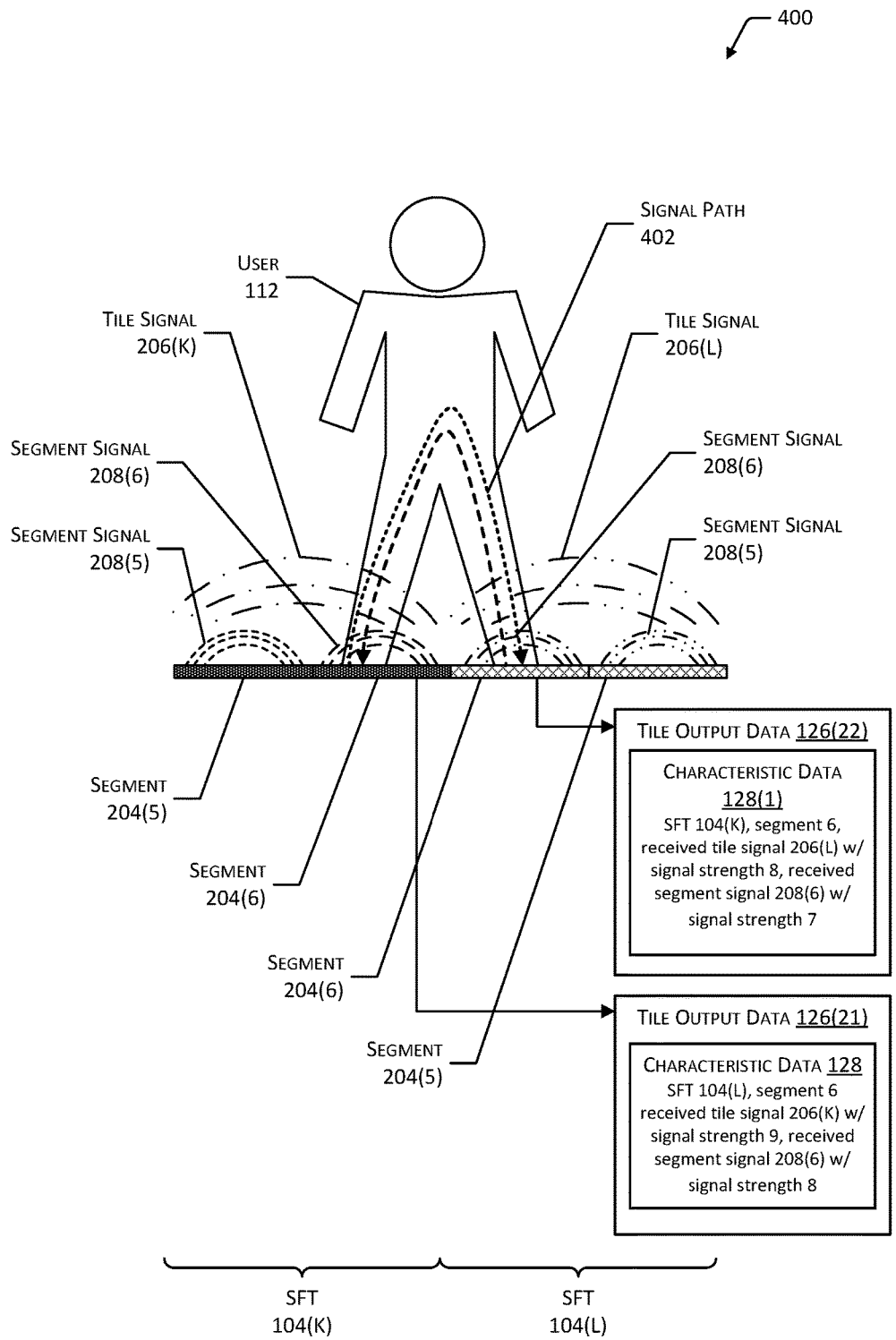
FIG. 4 illustrates the mixing of signals transmitted simultaneously by the smart floor tiles, according to some implementations.

FIG. 4 illustrates at 400 the mixing of EMS 106 transmitted simultaneously by the SFTs 104, according to some implementations. The body of the user 112, or another object proximate to the antenna 304, may electromagnetically couple to the antenna 304. This electromagnetic coupling may include, but is not limited to, capacitive coupling, electrostatic coupling, inductive coupling, and so forth. In other implementations, other types of coupling may take place. Once coupled, a signal path 402 is provided that incorporates the body of the user 112, their clothing, other users 112 they are in contact with, and so forth.

As described above and illustrated here, each SFT 104 and the respective segments 204 thereof are transmitting signals at particular frequencies. Each segment 204 emits from its respective one or more antennas 304 both the tile signal 206 and the respective segment signal 208. In this simplified example, each SFT 104 includes two segments 204. The user 112 is standing with a left foot on SFT 104(K) at segment 204(6), and thus the body of the user acts as the signal path 402 of the EMS 106 to a right foot on the SFT 104(L) at segment 204(6), and vice versa. Each of the SFTs 104 produces tile output data 126 that is indicative of the tile identifier data 334 of the receiving SFT 104.

The SFT 104(K) produces tile output data 126(21) that is indicative of the various signals received by the SFT 104(K) at the different frequencies and their received signal strength, while the tile output data 126(22) is indicative of the various signals received by the SFT 104(L). With the characteristic data 128, the combination of the various frequencies presented and their received signal strength provides information as to the placement of the foot with respect to a SFT 104. As the foot of the user 112 rests across different segments 204, and possibly different SFTs 104, it electromagnetically couples to the antennas 304 therein.

The tile output data 126 thus provides information about the location of a foot. Given the exchange of EMS 106 from one SFT 104 to another, a pair of SFTs 104 (or locations therein) may be determined. Given the reciprocity of the exchanges of EMS 106 and the resulting characteristic data 128, the two feet may be associated with a single user 112. In some implementations, a location of the user 112 may be determined to be between the feet locations. For example, the tracking module 134 may generate tracking data 136 that indicates the location of the user 112(1) is at a midpoint between their left and right footprints.

The tracking module 134 may utilize certain assumptions or rules in the determination of a location of the user 112. For example, the user 112 may be assumed to have two feet, the feet may be assumed to have a minimum length of 4 inches but less than 20 inches, and so forth. The tracking module 134 may also utilize data about the physical layout of the facility. For example, the physical arrangement of the SFTs 104 with respect to one another, the arrangement of the segments 204 therein, and so forth, may be used.

Figure 5:
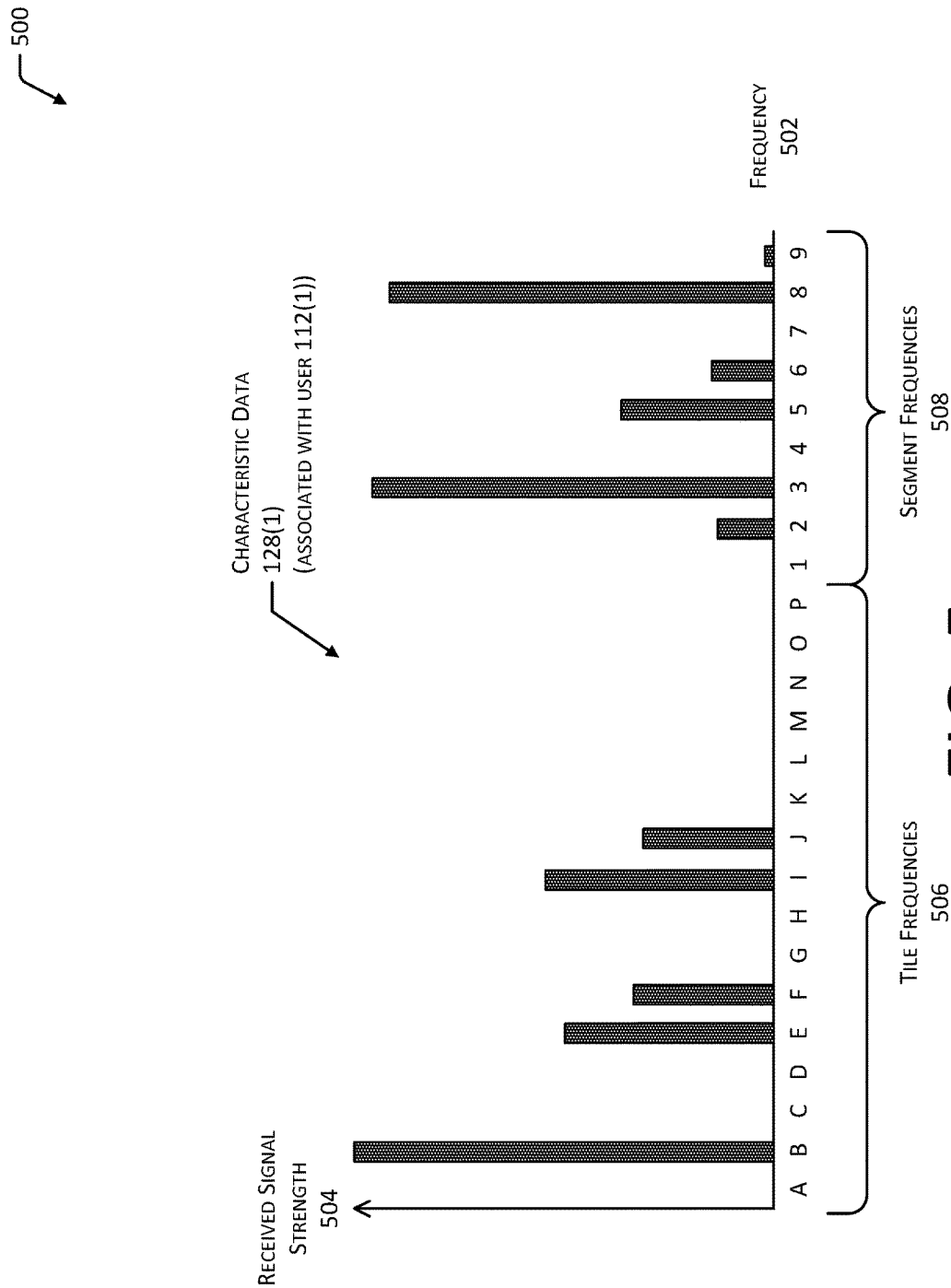
FIG. 5 illustrates a graph of combined received signal characteristics for a first user, such as received by a receiver in a fixture or a smart floor tile, according to some implementations.

FIG. 5 illustrates a graph 500 of combined received signal characteristic data 128 for the first user 112(1) shown in FIG. 2. The characteristic data 128 may be generated using data obtained by a receiver 326 in an SFT 104 or a fixture 108, according to some implementations.

In this illustration, the EMS 106 that are combined and propagated through the signal path 402 of the user 112(1) are shown. For example, the graph 500 may result from the combination of characteristic data 128 obtained from the SFTs 104 indicated.

Along a horizontal axis are bins indicative of the different frequencies 502 in use in a cluster 202 while a vertical axis indicates the received signal strength 504 of the signals in the respective bins. For example, the frequency 502 depicts 25 bins including sixteen tile frequencies 506 A-P for tile signals 206 and nine segment frequencies 508 for segment signals 208. The received signal strength 504 may be indicative of a maximum value for all signals received for that frequency 502 bin, a cumulative signal strength that comprises a sum of the received signal strengths received for that frequency 502 bin, an average signal strength of the values of received signal strengths for that frequency 502 bin, and so forth. For example, the cumulative signal strength may comprise a sum of signal strength values. Continuing the example here, the left foot of the user 112(1) may be resting on three different segments. The SFTs 104 and their received signal strength values may be as follows: 104(E)(3) received signal strength 7, 104(I)(3) received signal strength 10, 104(J)(3) received signal strength 5. The cumulative signal strength may be 22.

The characteristic data 128 is depicted here in graphical format, but it is understood that the characteristic data 128 may be represented using various data structures including, but not limited to tables, linked lists, delimiter separated values, serialized data, and so forth.

Figure 6:
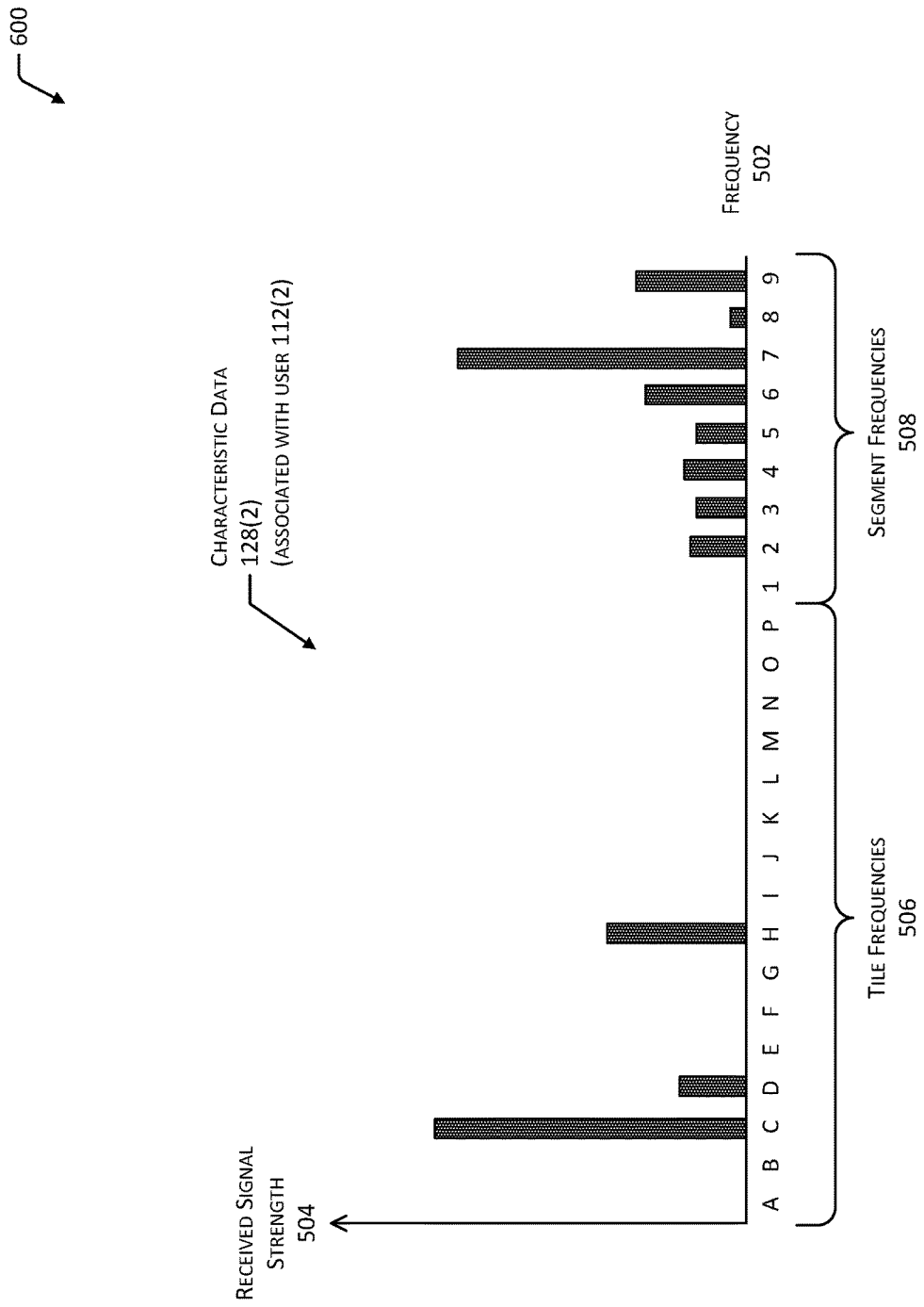
FIG. 6 illustrates a graph of combined received signal characteristics for a second user, such as received by a receiver in a fixture or a smart floor tile, according to some implementations.

FIG. 6 illustrates a graph 600 of combined received signal characteristic data 128 for the second user 112(2) shown in FIG. 2. The characteristic data 128 may be generated using data obtained by a receiver 326 in an SFT 104 or a fixture 108, according to some implementations. As above with respect to FIG. 5, a horizontal axis is indicative of frequency 502 bins while the vertical axis is indicative of the received signal strength 504. The tile frequencies 506 and the segment frequencies 508 are also shown.

Note the differences that are apparent in the characteristic data 128(1) of the first user 112(1) shown in FIG. 5 and the characteristic data 128(2) of the second user 112(2) shown in FIG. 6. For example, the characteristic data 128(1) shows a tile signal 206(B) while the characteristic data 128(2) shows no such signal. The configuration of the received signal strengths 504 for the tile frequencies 506 are thus different. Also, because the users 112 are standing on different portions of their respective SFTs 104, each user 112 exhibits different arrangements of segment frequencies 508, as well as tile frequencies 506.

By processing the characteristic data 128, a location for each foot may be obtained. For example, based on the characteristic data 128(2), the user 112(2) is determined to be standing on SFTs 104(C), (D), and (H). Given the distribution of the segment frequencies 508 and the known arrangement of the SFTs 104 and segments 204 with respect to one another, the relative positions of the left and right feet of a user 112 may be reconstructed.

In one implementation, another frequency allocation scheme may be used. For example, each segment 204 in the cluster 202 may emit a segment signal 208 that is distinct within the cluster 202, and the tile signal 206 may be omitted. Continuing the example, given the sixteen SFTs 104 with their respective nine segments, 144 different frequencies may be used in a cluster 202.

In another implementation, segments 204 may be omitted and each SFT 104 within a cluster 202 may emit a tile signal 206 that is distinct within the cluster 202. For example, given the sixteen SFTs 104 in a cluster 202, sixteen different frequencies may be used.

Figure 7:
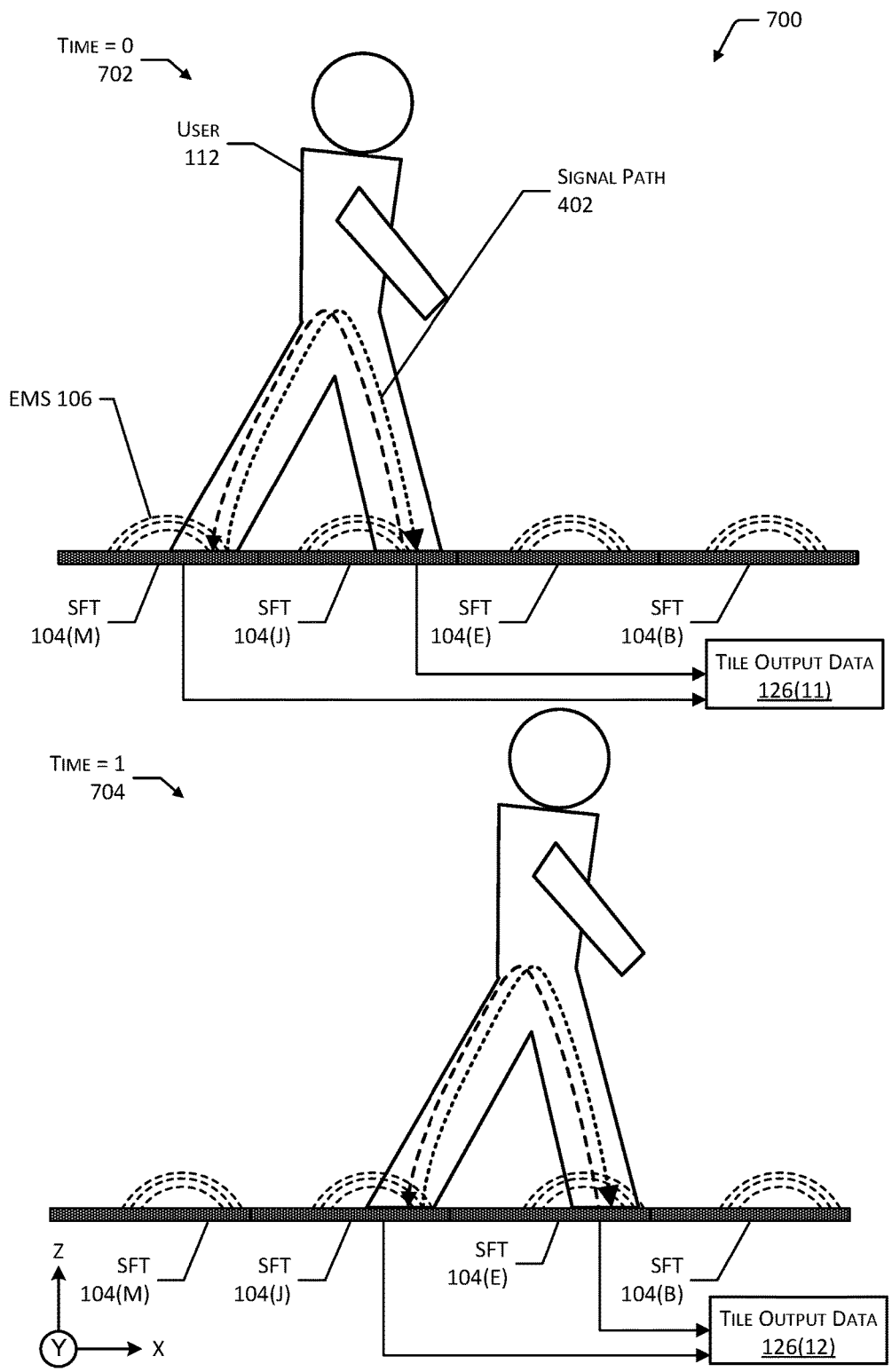
FIG. 7 illustrates tracking of a user as they move across the smart floor tiles, according to some implementations.

FIG. 7 illustrates tracking 700 of a user 112 as they move across the SFTs 104, according to some implementations. At 702, the user 112 is shown at a first time=0. As described above, based on the tile output data 126(11), a first location of the user 112 is determined as being between SFT 104(M) and SFT 104(J) based on the location of the left and right feet of the user 112. At 704, the user 112 is shown at a second time t=1. A second location of the user 112 is determined as being between SFT 104(J) and SFT 104(E). A time series of these user locations may be used to describe the user path 114. As described above, if the entry 110 involves identification, authentication, or other functions, this identity may be asserted with the user 112 as they move throughout the facility 102 along the user path 114.

Figure 8:
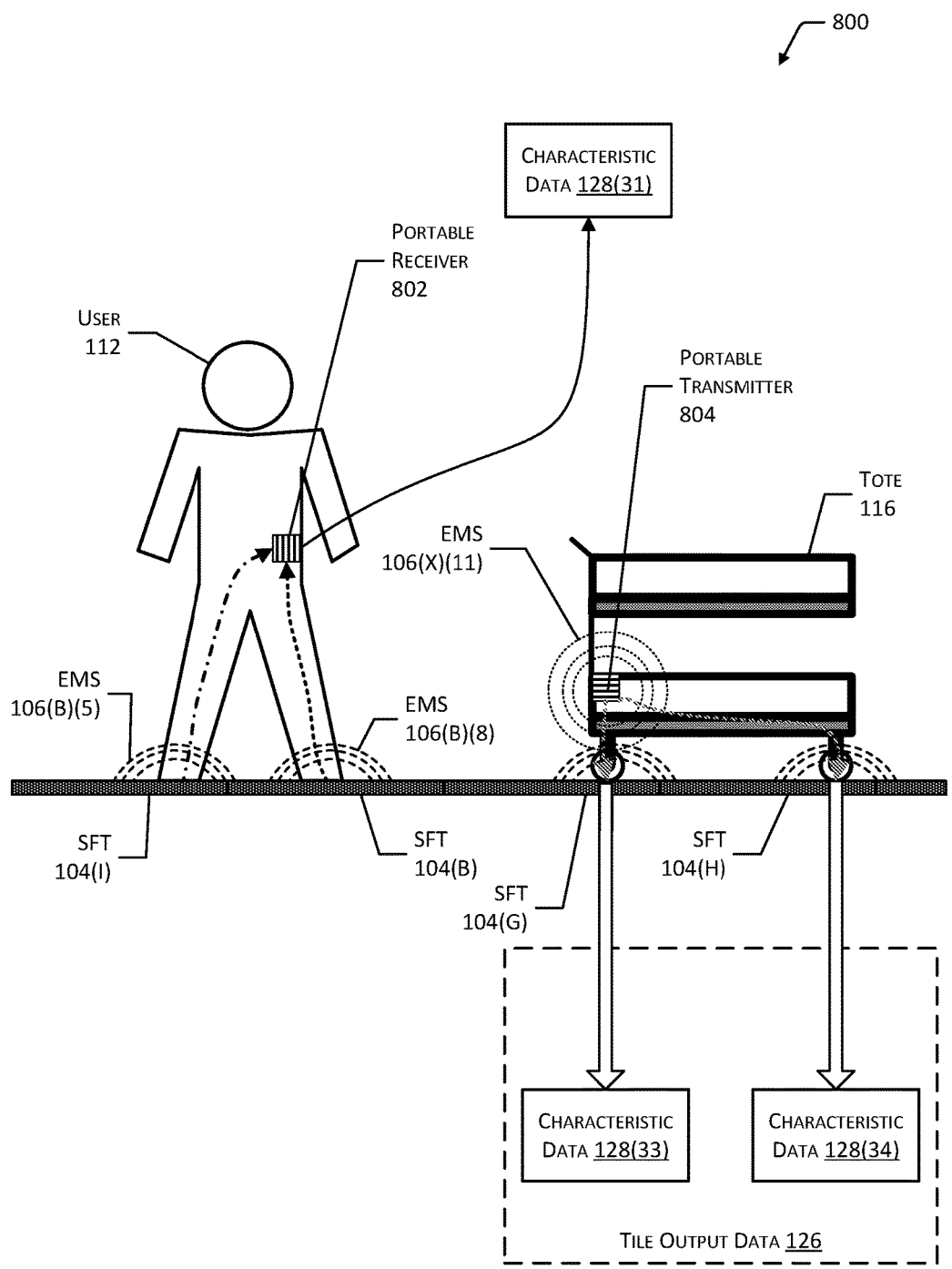
FIG. 8 illustrates the use of a portable receiver to detect the signals transmitted by the smart floor tiles, according to some implementations.

FIG. 8 illustrates the use 800 of a portable receiver 802 to detect the signals transmitted by the SFTs 104, according to some implementations. The user 112, a tote 116, or other object may be equipped with the portable receiver 802. The portable receiver 802 may be electromagnetically coupled to the user 112 and is configured to receives the EMS 106 and generate data such as the characteristic data 128, an identifier of the portable receiver 802, a timestamp, and so forth. For example, the portable receiver 802 may include a communication interface such as a Wi-Fi or Bluetooth compliant network interface that allows for wireless exchange of data with another computing device. The portable receiver 802 may be acquire the characteristic data 128 and send this characteristic data 128 to a server or other computing device. The portable receiver 802 may be associated with a particular user account, such as that of an associate or affiliate of the facility. The portable receiver 802 may obtain the characteristic data 128 such as shown in FIG. 5. The characteristic data 128 may be sent via the communication interface to a server that determines the user 112(1) is located at a position centered on SFT 104(F), segment (6).

In another implementation, the user 112 or other object may utilize a portable transmitter 804. The portable transmitter 804 transmits an EMS 106 at one or more particular frequencies that will result in a receiver generating characteristic data 128 associated with that particular object. Similar to that described above, the system may use the characteristic data 128 to specifically identify one or more of a particular category or specific identity of a particular user 112, tote 116, or other object. For example, all totes 116 may be issued a portable transmitter 804 that emits a signal at 76 kHz. In another example, each tote 116 may have a different assigned frequency, such that tote 116(1) has a portable transmitter 804 that emits at 78 kHz while another tote 116(2) transmits at 81 kHz. As a result, the receiver(s) 326 of the SFTs 104 proximate to the wheels of the tote 116 detect the signal and produce tile output data 126 with characteristic data 128 showing the signal(s) emitted by the portable transmitter 804.

The portable transmitter 804 may be provided in a variety of different form factors. For example, the portable transmitter 804 may comprise a device that may be mounted on the belt, worn as a wristband, a necklace, or a headband, attached to safety equipment worn by the user 112, and so forth. In some implementations, the portable transmitter 804 may be incorporated into another device, such as a smartphone, point-of-sale terminal, and so forth.

Other information may be gathered with this configuration, or in the earlier configurations, without the portable transmitter 804. For example, it may be determined which user 112 is in contact with a particular tote 116 based on the characteristic data 128 reported by their portable receiver 802. In this example, the characteristic data 128 may include the EMS 106 emitted from the SFTs 104 under the tote 116 that are propagated via the tote 116 into the user 112, the EMS 106 emitted by the portable transmitter 804, and so forth.

In some implementations, the portable receiver 802, portable transmitter 804, and so forth, may be in communication with the inventory management system 130. For example, these devices may communicate using Wi-Fi with an access point. In another example, data may be transferred using the SFTs 104. Continuing this example, a signal may be transferred that encodes data which is then received by the receiver 326 in the floor 102. Likewise, the transmitter 328 in the SFT 104 may send data to a receiver onboard the tote 116 or other device.

In some implementations, the functions of the portable receiver 802 and the portable transmitter 804 may be combined in a single device. For example, a portable transceiver may be configured to transmit EMS 106 and receive EMS 106.

Fixed installations may also use these devices. For example, the components and functions of the portable receiver 802 may be incorporated into or associated with a fixed device, such as a door handle. When the user 112 touches the door handle, the EMS 106 propagated through their body from the SFT 104 to the door handle may provide characteristic data 128 that may be used to identify that user 112. In another example, the components and functions of the portable transmitter 804 may be incorporated into or associated with a fixed device, such as a handrail. The handrail may emit the EMS 106 and a receiver, such as the portable receiver 802 or a receiver in the SFT 104, may be used to provide characteristic data 128 that may be used to identify that user 112.

Figure 9:
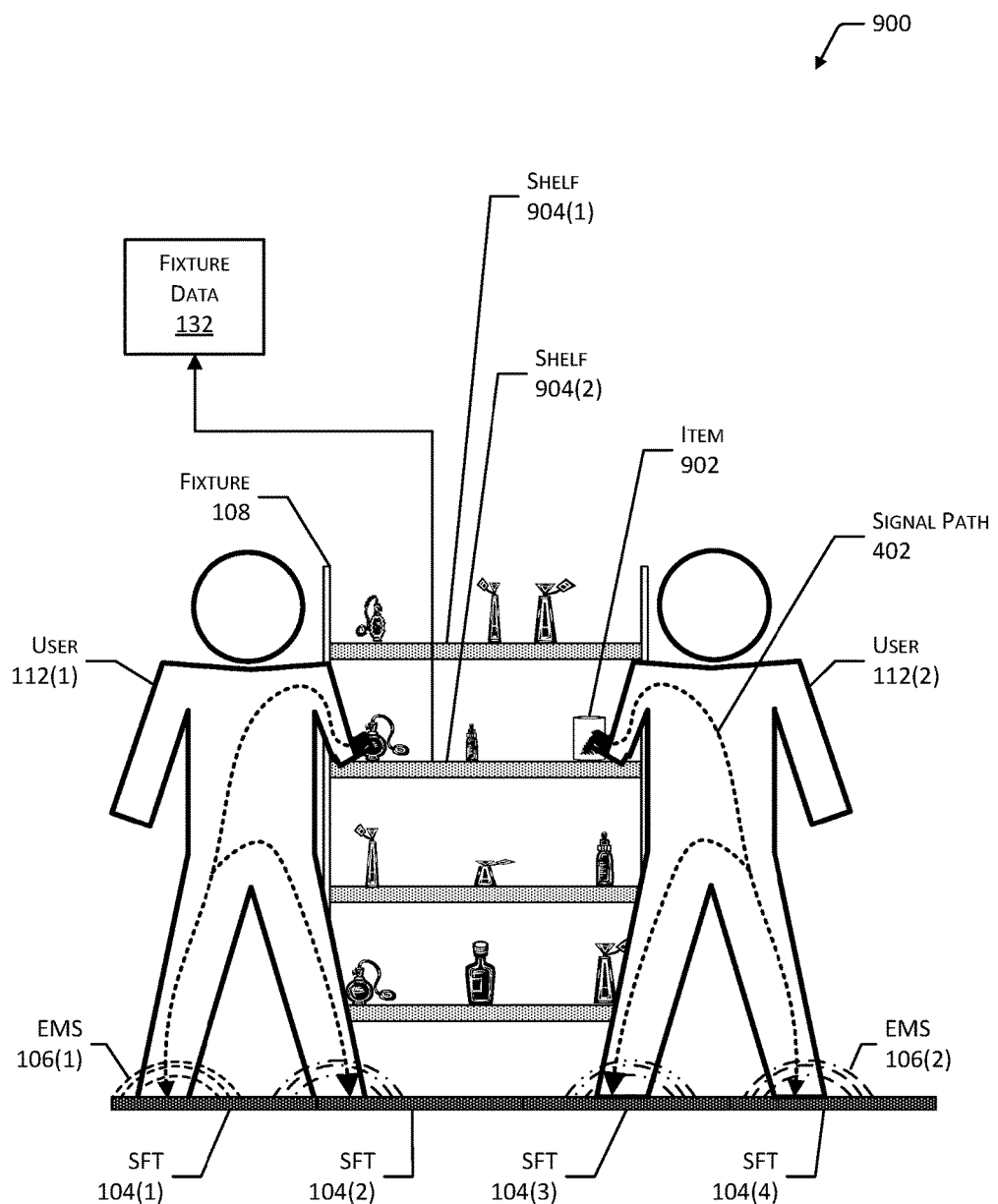
FIG. 9 illustrates the use of a signal transmitted by the smart floor tiles to determine a particular user is interacting with a particular portion of a fixture, according to some implementations.

FIG. 9 is an illustration 900 of the use of EMS 106 to determine a particular user 112 is interacting with a particular portion of fixture 108, according to some implementations.

As described above, the fixtures 108 may be used to store one or more items 902. As illustrated here, the fixture 108 includes items 902 stowed on four shelves 904(1), 904(2), 904(3), and 904(4). In other implementations, the fixture 108 may comprise racks, bins, hangers, and so forth.

As depicted here, a first SFT 104(1) transmits a first combination of EMS 106(1) along a signal path 402 of the body of the first user 112(1), while a second SFT 104(2) transmits a second combination of EMS 106(2) along a signal path 402 of the body of the second user 112(2). The first EMS 106(1) conveys first characteristic data 128(1), while the second EMS 106(2) conveys second characteristic data 128(2). As respective users 112 pick or place items 902 on one or more of the shelves 904, their respective combinations of EMSs 106 are propagated along their respective bodies. The shelves 904 are equipped with one or more antennas 304 and one or more receivers 326 (not shown). In some implementation, shields or other arrangements of antennas 304 may be present to provide directionality to the patterns of the antennas 304. The electronics of the shelves 904 generate the fixture data 132. The fixture data 132 may comprise the characteristic data 128 of the EMS 106 that has been received by the shelf 904. In some implementations, the fixture data 132 may include fixture identifier data indicative of a particular fixture 108 or portion thereof, a timestamp, and so forth.

The shelves 904 may include an array of antennas 304, allowing for a determination of gesture data indicative of where the hand of the user 112 is relative to the fixture 108, motion of the hand, and so forth. For example, each shelf 904 may include two antennas 304, one on the left side and one on the right side. By analyzing the relative signal strength of the EMS 106 as conveyed by a signal path 402 from the foot of the user 112 to their hand as it is near or in contact with the shelf 904, a position of the hand at a particular time may be determined.

By utilizing data from the antennas 304 and receivers 326 on different shelves 904, information about the position of the hand in three-dimensional space may be determined. For example, antennas 304 on shelf 904(1) and 904(2) may be used to determine the position of the hand of the user 112 relative to those shelves 904.

In some implementations, an antenna 304 may be located beneath the item 902. As a result of the user 112 coming into contact with the item 902, an increase in the amplitude of the EMS 106 as measured by the receiver 326 connected to the antenna 304 may be determined. Given predetermined information specifying that a particular type of item 902 is stowed on the shelf 904 proximate to the antenna 304(1), based on the fixture data 132, the inventory management system 130 is able to generate interaction data 142. For example, an item 902 of the type "pet food" is assigned for stowage on shelf 904(1) in a lane that is above antenna 304(16). The fixture data 132 may indicate that the signal strength of one or more frequencies of the second EMS 106(2) that conveyed the second characteristic data 128(2) exceeded a threshold value. The amplitude of the signals as indicated in the second characteristic data 128(2) is thus indicative of the user 112 coming into contact with the item 902. Based on the particular characteristic data 128, a particular user 112 may thus be associated with a particular user account, and the particular user 112 may be assessed a charge for the pick of the can of pet food.

Other sensors 306, such as weight sensors, capacitive sensors, and so forth, may also be used. Data from these other sensors 306 may then be used in conjunction with the characteristic data 128 and information obtained from the receivers 326 about the EMS 106 to generate the interaction data 142. The characteristic data 128 transferred by way of the EMS 106 to the antenna 304 in the shelf 904 may be used to determine who is picking what item 902. A change in weight of the shelf 904 as measured by one or more weight sensors 306 may be used to determine the quantity of the items 902 that are either picked or placed. For example, the change in weight may be divided by a known weight of a sample of the item 902. By using these techniques, the inventory management system 130 is able to quickly and inexpensively determine which user 112 interacted with a particular item 902, the fixtures 108, or portion thereof.

In some implementations, information about how the EMS 106 is propagated may be used to distinguish between one type of item 902 and another type of item 902 that the user 112 may be interacting with. For example, the same antenna 304 may service two lanes on the shelf 904. In a first lane are stowed boxes of dried pasta, while the second lane stows metal cans of tomato sauce. The metal can provides a better signal pathway for the EMS 106 compared to the box of dried pasta. By analyzing the received signal strength of the EMS 106, the user 112 coming into contact with the metal can may be distinguished from the user 112 coming into contact with the box of dried pasta. For example, if the received signal strength of the EMS 106 exceeds a threshold value, the contact may be determined to be with the metal can in the second lane. Similarly, if the received signal strength of the EMS 106 is below a threshold value, the contact may be determined to be with the box of dried pasta in the first lane.

As described above with regard to FIG. 8, in some implementations, the EMS 106 may be transmitted by portable transmitter 804. In other implementations, the shelf 904 may emit one or more EMS 106 that are detected using the receiver 326 in the SFT 104 or the portable receiver 802.

In other implementations, the same techniques may be used to determine if the user 112 is touching other objects in the environment. For example, the placement of a user's 112 hand with respect to a table or countertop may be determined. In another example, the techniques may be used to determine that a user 112 is touching a door handle, sitting in a chair, sitting on a bench, and so forth.

Figure 10:
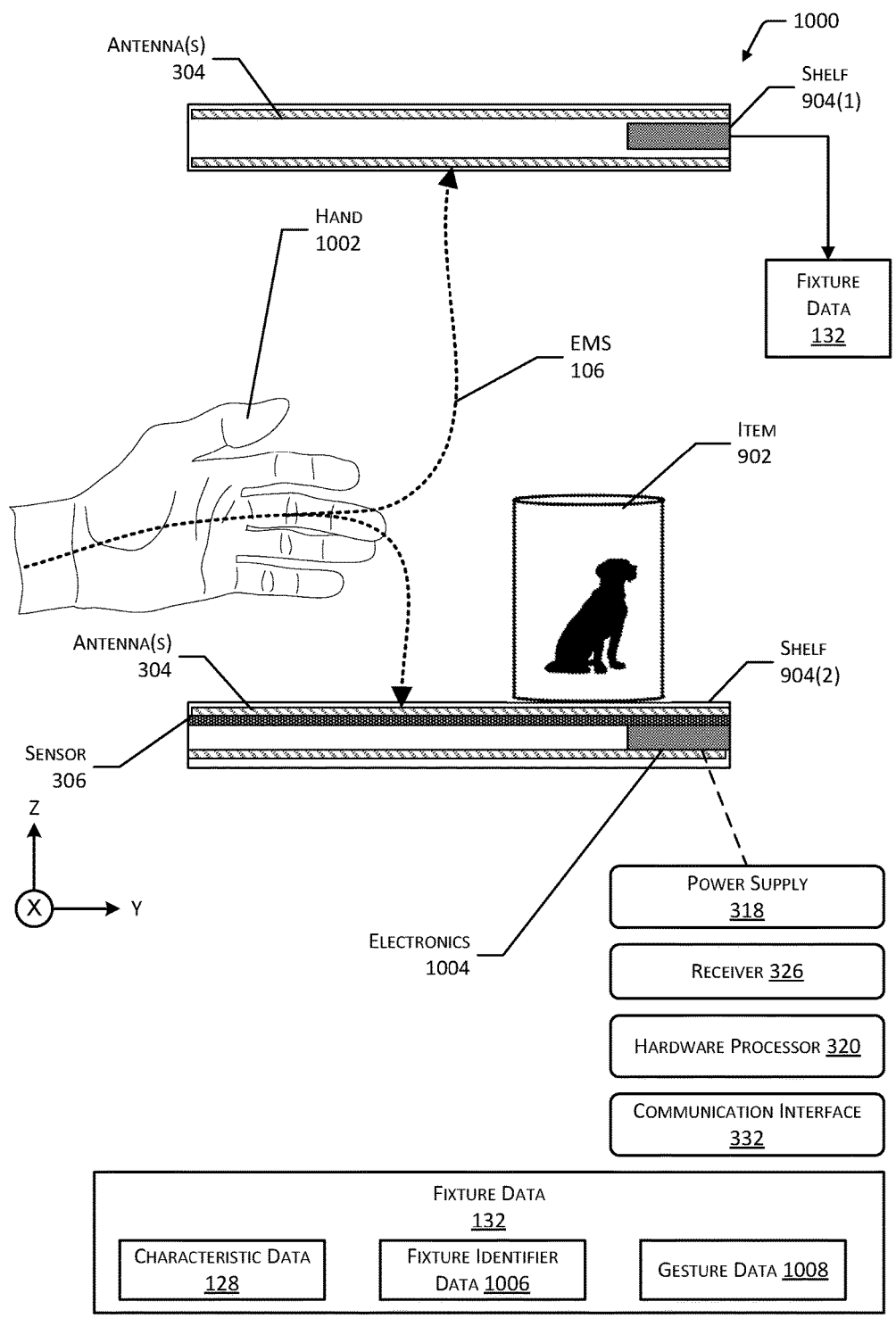
FIG. 10 illustrates an enlarged view of the use of an electromagnetic signal to generate gesture data and other information indicative of which item a user interacted with at the fixture, according to some implementations.

FIG. 10 illustrates an enlarged side view 1000 of the use of an EMS 106 to generate gesture data and other information indicative of which item 902 a user 112 interacted with at the fixture 108, according to some implementations.

As described above, the shelves 904 or other fixtures 108 may incorporate one or more antennas 304 that are coupled to one or more receivers 326. As a hand 1002 of the user 112 approaches the fixture 108, antennas 304 may receive the EMS 106 as transmitted by a SFT 104, portable transmitter 804, and so forth.

Electronics 1004 associated with the shelf 904 recover the characteristic data 128 conveyed by the EMS 106. The electronics 1004 may be similar to the electronics 312 described above with regard to the SFT 104. For example, the electronics 1004 may include a power supply 318, a receiver 326, the hardware processor 320, a communication interface 332, one or more antennas 304, and so forth. In some implementations, the electronics 1004 may include one or more transmitters 328.

The hardware processor 320 may be configured to generate the fixture data 132. The fixture data 132 may include one or more of characteristic data 128, fixture identifier data 1006, gesture data 1008, and so forth. As described above, the characteristic data 128 comprises information that is conveyed by an EMS 106. Fixture identifier data 1006 is used to identify a particular fixture 108 or portion thereof, such as a shelf 904, lane upon the shelf 904, and so forth. The gesture data 1008 may comprise information indicative of a location of the hand 1002 of the user 112 with respect to the fixture 108 or portion thereof, duration of contact by the hand 1002, direction of movement of the hand 1002, and so forth. The gesture data 1008 may be generated based on information about the EMS 106 obtained by one or more antennas 304. For example, based on the changes over time of an amplitude or received signal strength of the EMS 106 at a given antenna 304, a position of the hand 1002 or portion thereof may be determined.

The gesture data 1008 may include information such as a time series of a position of the hand 1002. In some implementations, the gesture data 1008 may be used to generate trajectory data indicative of a trajectory of the hand 1002. This trajectory may then be used to help determine which lane the user 112 is interacting with, disambiguate the user 112 from among several users 112 if the characteristic data 128 is unavailable, and so forth.

The gesture data 1008 may include information indicative of contact duration between the user 112 and the item 902. For example, a contact threshold time may indicate a minimum amount of time that the user 112 has to be in contact with the item 902 before a contact is deemed to occur. The comparison of the contact duration and the contact threshold time may be used to reduce false positives, minimize the impact of noise, and so forth. In some implementations, the contact may also be determined at least in part by the received signal strength of the EMS 106 during contact. For example, contact may be determined when the received signal strength is above a threshold strength value. Contact may be determined when the contact duration exceeds the contact threshold time and the received signal strength is above the threshold strength value.

The gesture data 1008 may comprise a time series of coordinates, each set of coordinates indicating a position of the hand 1002 at successive times. The gesture data 1008 may provide coordinates in one, two, or three-dimensional spaces. For example, coordinates in a one-dimensional space for the gesture data 1008 may indicate where along the shelf 904 from left to right the hand 1002 is determined to be. In another example, coordinates in three-dimensional space for the gesture data 1008 may indicate where the hand 1002 is in terms of left to right, front to back and height above the shelf 904.

To generate gesture data 1008, the hand of the user 1002 does not necessarily need to be in contact with the portion of the fixture 108. For example, proximity of the hand 1002 may be sufficient to allow for coupling between the hand 1002 and the antenna 304 that is sufficient to transfer the EMS 106.

As described below in more detail with regard to FIG. 11, the fixture 108 may incorporate other sensors as well.

While FIGS. 9 and 10 depict the EMS 106 as originating in the SFT 104, in other implementations, the signal pathway may be reversed. For example, a transmitter 328 may be located at the shelf 904 that generates an EMS 106 associated with a particular type of item 902. As the user 112 approaches and then grasps the item 902, a signal path 402 may be provided that conveys the EMS 106 from the shelf 904 to a receiver in the SFT 104. In other implementations, the EMS 106 may be produced by the portable transmitter 804.

Figure 11:
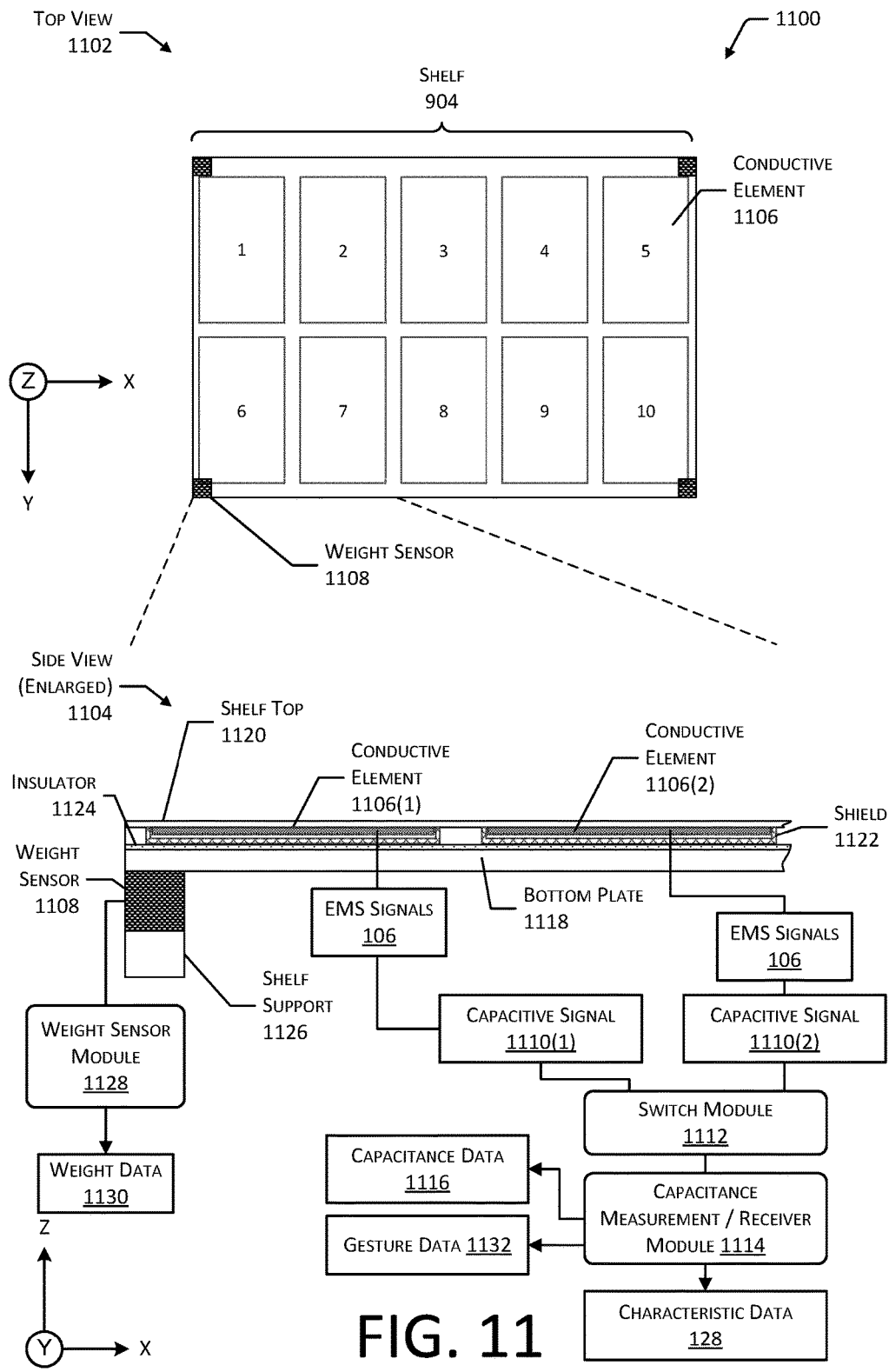
FIG. 11 depicts a block diagram of a fixture such as a shelf that is configured to generate gesture data, characteristic data, and so forth, according to some implementations.

FIG. 11 depicts a block diagram 1100 of a fixture 108 such as a shelf 904 that is configured to generate gesture data 1008, characteristic data 128, and so forth, according to some implementations. A top view 1102 of a shelf 904 and a side view 1104 of an enlarged portion of the shelf 904 are depicted.

As shown in the top view 1102, a plurality of conductive elements 1106 are distributed in rows and columns across the shelf 904 to form an array. The conductive elements 1106 may be planar and formed into shapes such as rectangles (as shown here). Arranged proximate to each of the four corners of the shelf 904 are weight sensors 1108. The conductive elements 1106 may be configured for dual use as antennas 304 and as elements of a capacitive sensor array. In other implementations, other shapes and arrangements of the conductive elements 1106 may be used.

The conductive elements 1106 may be connected by wire or other electrical conductor. The wire transfers a capacitive signal 1110 between the conductive element 1106 and other circuitry, such as a switch module 1112. The switch module 1112 may in turn connect to a capacitance measurement/receiver module 1114. For example, the capacitive signal 1110 may be used to supply a charge to the conductive element 1106. The capacitance measurement/receiver module 1114 determines a change in this charge over time and generates capacitance data 1116. The capacitance measurement/receiver module 1114 may also generate the characteristic data 128 in some implementations.

The switch module 1112 may comprise switching circuitry that allows for the capacitance measurement/receiver module 1114 to be selectively connected to a particular conductive element 1106. In some implementations, a plurality of switch modules 1112 may be used to allow for different switching configurations. For example, a first switch module 1112(1) may have 4 outputs, each connecting to additional switch modules 1112(2), 1112(3), 1112 (4), 1112 (5). Each of those switch modules 1112(2)-(5) may have 4 outputs in which each output is connected to additional switch modules 1112, and so forth. The switching circuitry may comprise microelectromechanical switches, relays, transistors, diodes, and so forth. Other configurations or networks of switch modules 1112 may be implemented as well.

The capacitance measurement/receiver module 1114 may be used to generate the capacitance data 1116. The capacitance data 1116 may include information such as a capacitance value, information indicative of a particular conductive element 1106, timestamp, and so forth. In some implementations, circuitry or functionality of the switch module 1112 and the capacitance measurement/receiver module 1114 may be combined. The capacitance measurement/receiver module 1114 may also include a receiver 326 to allow for the reception of the EMS 106.

A bottom plate 1118 may provide mechanical support for one or more of the conductive elements 1106. In some implementations, the bottom plate 1118 may comprise an electrical conductor that acts as a shield for an electric field present at the conductive element 1106.

A shelf top 1120 may be arranged atop one or more of the conductive elements 1106 and the bottom plate 1118. One or more items 902 may rest on or above the shelf top 1120. For example, the shelf top 1120 may comprise a non-conductive material such as a plastic or ceramic.

The conductive element 1106 may comprise one or more electrically conductive materials. The electrically conductive elements 1106 may be formed as one or more of a coating, thin-film, paint, deposited material, foil, mesh, and so forth. For example, the conductive element 1106 may comprise an electrically conductive paint, silver paste, aluminum film, a copper sheet, and so forth. The conductive element 1106 may be deposited upon, embedded within, laminated to, or otherwise supported by the bottom plate 1118, the shelf top 1120, and so forth. These conductive elements 1106 may then be connected to the capacitance measurement circuitry in the capacitance measurement/receiver module 1114.

One or more shields 1122 may be provided. A shield 1122 may be adjacent to one or more of the conductive elements 1106. The shield 1122 comprises an electrically conductive material and is separated by an electrical insulator, such as air, plastic, ceramic, and so forth, from the conductive element 1106. A single shield 1122 may be used to provide shielding for one or more conductive elements 1106. During operation, the shield 1122 may be driven at the same voltage potential of the input of the capacitive signal 1110. In this configuration, there is no difference in electrical potential between the shield 1122 and the conductive element 1106. External interference may then couple to the shield 1122 producing little interaction with the conductive element 1106. The shield 1122 may also be used to direct the electric field produced by the conductive element 1106 during operation. For example, the electric field is directed generally away from the shield 1122. Using this technique, the capacitive sensor may detect objects on the side opposite that of the shield 1122, with the shield 1122 preventing the capacitive sensor from "seeing" or being affected by an object behind the shield 1122.

The shelf 904 may include other layers or structures. For example, an electrical insulator 1124 such as polyethylene terephthalate may be arranged between the bottom plate 1118 and the shield 1122 (if present) or the conductive element 1106. Wires, circuit traces, or other electrically conductive pathways may conduct the capacitive signal 1110 between the capacitance measurement/receiver module 1114 and the conductive element 1106.

The bottom plate 1118 may be supported by one or more of the weight sensors 1108. In some implementations, the bottom plate 1118 may comprise an electrically conductive material and act as a ground plane, such as if connected to an earth ground. The weight sensor 1108 may in turn be supported by a shelf support 1126.

The one or more of the weight sensors 1108 may be connected to the weight sensor module 1128. The weight sensor module 1128 may comprise circuitry that is used to generate the weight data 1130. The weight data 1130 may include information such as a weight value, information indicative of a particular weight sensor 1108, timestamp, and so forth. In some implementations, circuitry or functionality of the weight sensor module 1128 and the weight sensor 1108 may be combined.

One or more image sensors (not shown) may be used to acquire image data at or near the shelf 904 or other fixture 108. The image data may comprise one or more still images, video, or combination thereof. The image sensor may have a field of view (FOV) that includes at least a portion of the shelf 904 or other type of fixture 108. For example, a camera may be mounted within the shelf 904 to acquire image data of one or more lanes of items 902 on the shelf 904.

Figure 12:
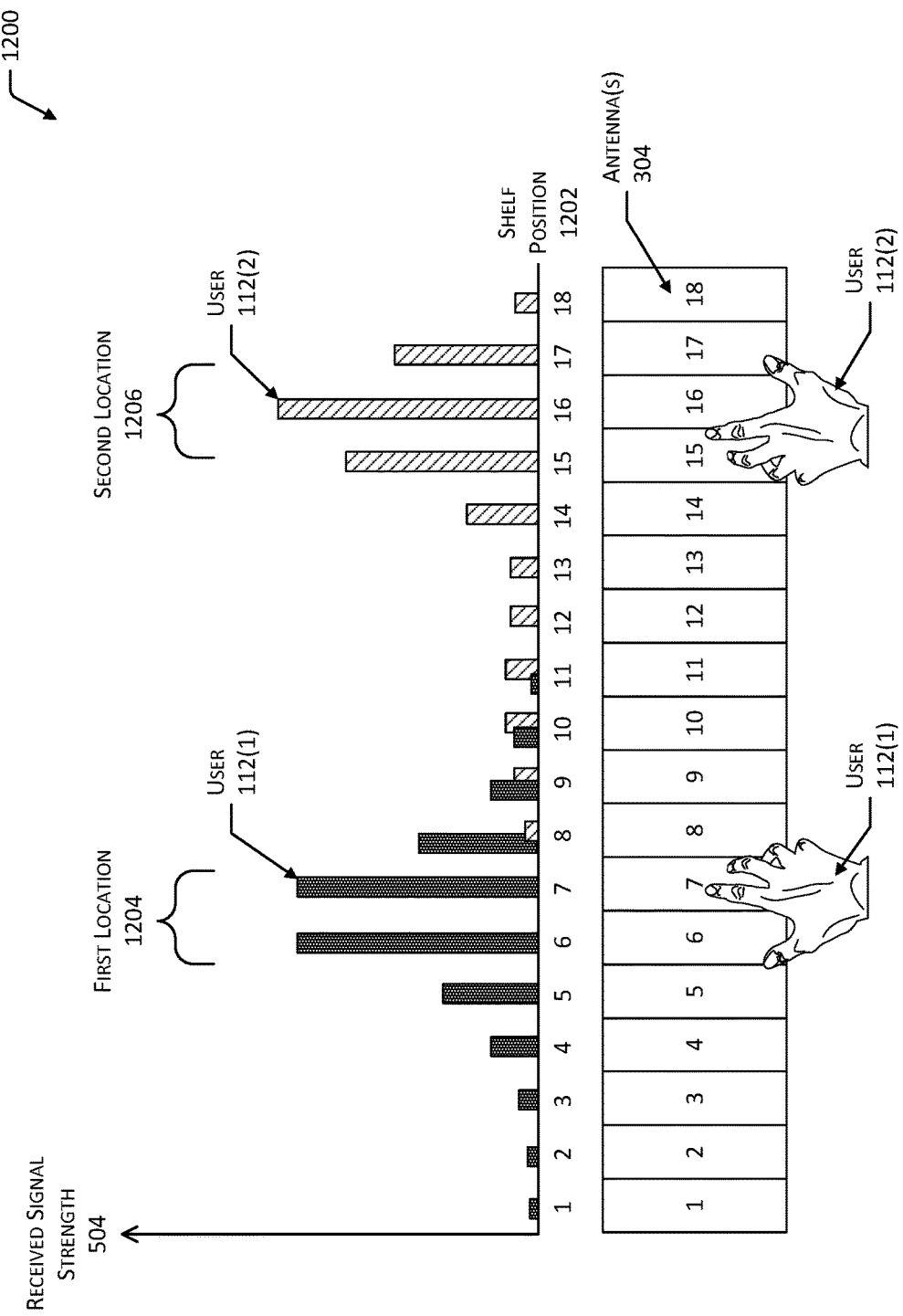
FIG. 12 depicts a scenario showing the signal strengths as received using different antennas at the fixture, according to some implementations.

FIG. 12 depicts a scenario 1200 showing the signal strengths as received using different antennas 304 at the fixture 108, according to some implementations. In this scenario, a graph is depicted along with a corresponding schematic of the antennas 304 laid out on a shelf 904. With regard to the graph, along a horizontal axis are bins indicative of shelf position 1202. Along the vertical axis of the graph is the received signal strength 504 received at the particular shelf position 1202.

Below the graph are the array of antennas 304 that may be positioned along the shelf 904. In this scenario, the shelf 904 includes sixteen antennas 304 arranged side by side. In one implementation, each lane of the shelf 904 may be associated with a particular antenna 304. A right hand 1002 of the first user 112(1) is shown reaching towards a first antenna. A left hand 1002 of the second user 112(2) is shown reaching towards a second antenna. As depicted by the graph above, the received signal strength 504 for the respective hands 1002 exhibit spikes at a first location 1204 and a second location 1206. As described above, the received signal strength 504 may be for a particular frequency, group of frequencies, and so forth.

To distinguish between the hands 1002 detected at the first location 1204 and the second location 1206, the characteristic data 128 may be assessed. For example, given where the respective users 112 are standing, they will exhibit particular set of characteristics or spectra that is the combination of the tile signals 206, segment signals 208, and so forth.

Figure 13:
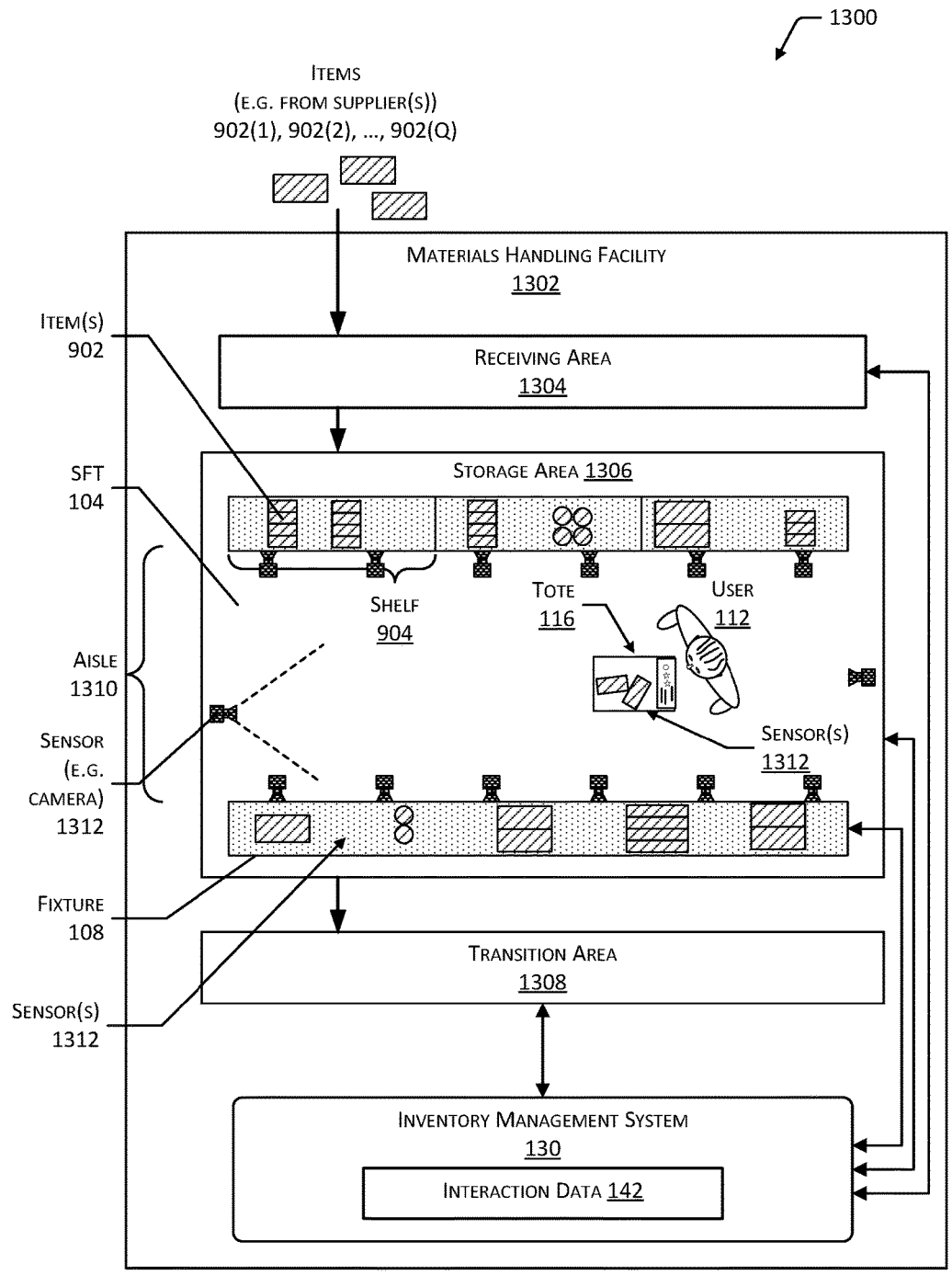
FIG. 13 is a block diagram illustrating a materials handling facility (facility) using the system, according to some implementations.

FIG. 13 is a block diagram 1300 illustrating a materials handling facility (facility) 1302 using the system 100, according to some implementations. A facility 1302 comprises one or more physical structures or areas within which one or more items 902(1), 902(2), . . . , may be held. The items 902 may comprise physical goods, such as books, pharmaceuticals, repair parts, electronic gear, and so forth.

The facility 1302 may include one or more areas designated for different functions with regard to inventory handling. In this illustration, the facility 1302 includes a receiving area 1304, a storage area 1306, and a transition area 1308. Throughout the facility 1302, the plurality of SFTs 104 may be deployed as described above.

The receiving area 1304 may be configured to accept items 902, such as from suppliers, for intake into the facility 1302. For example, the receiving area 1304 may include a loading dock at which trucks or other freight conveyances unload the items 902. In some implementations, the items 902 may be processed, such as at the receiving area 1304, to generate at least a portion of item data as described below. For example, an item 902 may be tested at the receiving area 1304 to determine the attenuation of an EMS 106 passing through it, and this information stored as item data.

The storage area 1306 is configured to store the items 902. The storage area 1306 may be arranged in various physical configurations. In one implementation, the storage area 1306 may include one or more aisles 1310. The aisle 1310 may be configured with, or defined by, the fixtures 108 on one or both sides of the aisle 1310. The fixtures 108 may include one or more of a shelf 904, a rack, a case, a cabinet, a bin, a floor location, or other suitable storage mechanisms for holding, supporting, or storing the items 902. For example, the fixtures 108 may comprise shelves 904 with lanes designated therein. The fixtures 108 may be affixed to the floor 102 or another portion of the structure of the facility 1302. The fixtures 108 may also be movable such that the arrangements of aisles 1310 may be reconfigurable. In some implementations, the fixtures 108 may be configured to move independently of an outside operator. For example, the fixtures 108 may comprise a rack with a power source and a motor, operable by a computing device to allow the rack to move from one location within the facility 1302 to another.

One or more users 112(1), 112(2), . . . , 112(U) and totes 116(1), 116(2), . . . , 116(T) or other material handling apparatus may move within the facility 1302. For example, the user 112 may move about within the facility 1302 to pick or place the items 902 in various fixtures 108, placing them on the tote 116 for ease of transport. The tote 116 is configured to carry or otherwise transport one or more items 902. For example, the tote 116 may include a basket, cart, bag, bin, and so forth. In other implementations, other material handling apparatuses such as robots, forklifts, cranes, aerial drones, and so forth, may move about the facility 1302 picking, placing, or otherwise moving the items 902. For example, a robot may pick an item 902 from a first fixture 108(1) and move the item 902 to a second fixture 108(2).

One or more sensors 1312 may be configured to acquire information in the facility 1302. The sensors 1312 may include, but are not limited to, weight sensors 1312(1), capacitive sensors 1312(2), image sensors 1312(3), depth sensors 1312(4), and so forth. The weight sensors 1312(1) may comprise the same or different hardware as the weight sensors 1108 described above. The sensors 1312 may be stationary or mobile, relative to the facility 1302. For example, the fixtures 108 may contain weight sensors 1312 (1) to acquire weight sensor data of items 902 stowed therein, image sensors 1312(3) to acquire images of picking or placement of items 902 on shelves 904, optical sensor arrays 1312(14) to detect shadows of the user's 112 hands 1002 at the fixtures 108, and so forth. In another example, the facility 1302 may include image sensors 1312(3) to obtain images of the user 112 or other objects in the facility 1302. The sensors 1312 are discussed in more detail below with regard to FIG. 14.

While the storage area 1306 is depicted as having one or more aisles 1310, fixtures 108 storing the items 902, sensors 1312, and so forth, it is understood that the receiving area 1304, the transition area 1308, or other areas of the facility 1302 may be similarly equipped. Furthermore, the arrangement of the various areas within the facility 1302 is depicted functionally rather than schematically. For example, in some implementations, multiple different receiving areas 1304, storage areas 1306, and transition areas 1308 may be interspersed rather than segregated in the facility 1302.

The facility 1302 may include, or be coupled to, the inventory management system 130. The inventory management system 130 is configured to interact with one or more of the users 112 or devices such as sensors 1312, robots, material handling equipment, computing devices, and so forth, in one or more of the receiving area 1304, the storage area 1306, or the transition area 1308.

During operation of the facility 1302, the sensors 1312 may be configured to provide sensor data, or information based on the sensor data, to the inventory management system 130. The sensor data may include the weight data 1130, the capacitance data 1116, the image data, and so forth. The sensors 1312 are described in more detail below with regard to FIG. 14.

The inventory management system 130 or other systems may use the sensor data to track the location of objects within the facility 1302, movement of the objects, or provide other functionality. Objects may include, but are not limited to, items 902, users 112, totes 116, and so forth. For example, a series of images acquired by the image sensor 1312(3) may indicate removal by the user 112 of an item 902 from a particular location on the fixture 108 and placement of the item 902 on or at least partially within the tote 116.

The facility 1302 may be configured to receive different kinds of items 902 from various suppliers and to store them until a customer orders or retrieves one or more of the items 902. A general flow of items 902 through the facility 1302 is indicated by the arrows of FIG. 13. Specifically, as illustrated in this example, items 902 may be received from one or more suppliers, such as manufacturers, distributors, wholesalers, and so forth, at the receiving area 1304. In various implementations, the items 902 may include merchandise, commodities, perishables, or any suitable type of item 902, depending on the nature of the enterprise that operates the facility 1302.

Upon being received from a supplier at the receiving area 1304, the items 902 may be prepared for storage in the storage area 1306. For example, in some implementations, items 902 may be unpacked or otherwise rearranged. The inventory management system 130 may include one or more software applications executing on a computer system to provide inventory management functions. These inventory management functions may include maintaining information indicative of the type, quantity, condition, cost, location, weight, or any other suitable parameters with respect to the items 902. The items 902 may be stocked, managed, or dispensed in terms of countable units, individual units, or multiple units, such as packages, cartons, crates, pallets, or other suitable aggregations. Alternatively, some items 902, such as bulk products, commodities, and so forth, may be stored in continuous or arbitrarily divisible amounts that may not be inherently organized into countable units. Such items 902 may be managed in terms of a measurable quantity such as units of length, area, volume, weight, time, duration, or other dimensional properties characterized by units of measurement. Generally speaking, a quantity of an item 902 may refer to either a countable number of individual or aggregate units of an item 902 or a measurable amount of an item 902, as appropriate.

After arriving through the receiving area 1304, items 902 may be stored within the storage area 1306. In some implementations, like items 902 may be stored or displayed together in the fixtures 108 such as in bins, on shelves 904, hanging from pegboards, and so forth. For example, all items 902 of a given kind are stored in one fixture 108. In other implementations, like items 902 may be stored in different fixtures 108. For example, to optimize retrieval of certain items 902 having frequent turnover within a large physical facility 1302, those items 902 may be stored in several different fixtures 108 to reduce congestion that might occur at a single fixture 108.

When a customer order specifying one or more items 902 is received, or as a user 112 progresses through the facility 1302, the corresponding items 902 may be selected or "picked" from the fixtures 108 containing those items 902. In various implementations, item picking may range from manual to completely automated picking. For example, in one implementation, a user 112 may have a list of items 902 they desire and may progress through the facility 1302 picking items 902 from the fixtures 108 within the storage area 1306 and placing those items 902 into a tote 116. In other implementations, employees of the facility 1302 may pick items 902 using written or electronic pick lists derived from customer orders. These picked items 902 may be placed into the tote 116 as the employee progresses through the facility 1302.

After items 902 have been picked, the items 902 may be processed at a transition area 1308. The transition area 1308 may be any designated area within the facility 1302 where items 902 are transitioned from one location to another or from one entity to another. For example, the transition area 1308 may be a packing station within the facility 1302. When the item 902 arrives at the transition area 1308, the items 902 may be transitioned from the storage area 1306 to the packing station. Information about the transition may be maintained by the inventory management system 130.

In another example, if the items 902 are departing the facility 1302, a list of the items 902 may be obtained and used by the inventory management system 130 to transition responsibility for, or custody of, the items 902 from the facility 1302 to another entity. For example, a carrier may accept the items 902 for transport with that carrier accepting responsibility for the items 902 indicated in the list. In another example, a user 112 may purchase or rent the items 902 and remove the items 902 from the facility 1302. During use of the facility 1302, the user 112 may move about the facility 1302 to perform various tasks, such as picking or placing the items 902 in the fixtures 108.

The inventory management system 130 may generate the interaction data 142. The interaction data 142 may be based at least in part on one or more of the tile output data 126, the fixture data 132, and so forth. The interaction data 142 may provide information about an interaction, such as a pick of an item 902 from the fixture 108, a place of an item 902 to the fixture 108, a touch made to an item 902 at the fixture 108, a gesture associated with an item 902 at the fixture 108, and so forth. The interaction data 142 may include one or more of the type of interaction, duration of interaction, interaction location identifier indicative of where from the fixture 108 the interaction took place, item identifier, quantity change to the item 902, user identifier, and so forth. The interaction data 142 may then be used to further update the item data. For example, the quantity of items 902 on hand at a particular lane on the shelf 904 may be changed based on an interaction that picks or places one or more items 902.

The inventory management system 130 may combine or otherwise utilize data from different sensors 1312 of different types. For example, weight data 1130 obtained from weight sensors 1312(1) at the fixture 108 may be used instead of, or in conjunction with, one or more of the capacitance data 1116 to determine the interaction-data 142.

Figure 14:
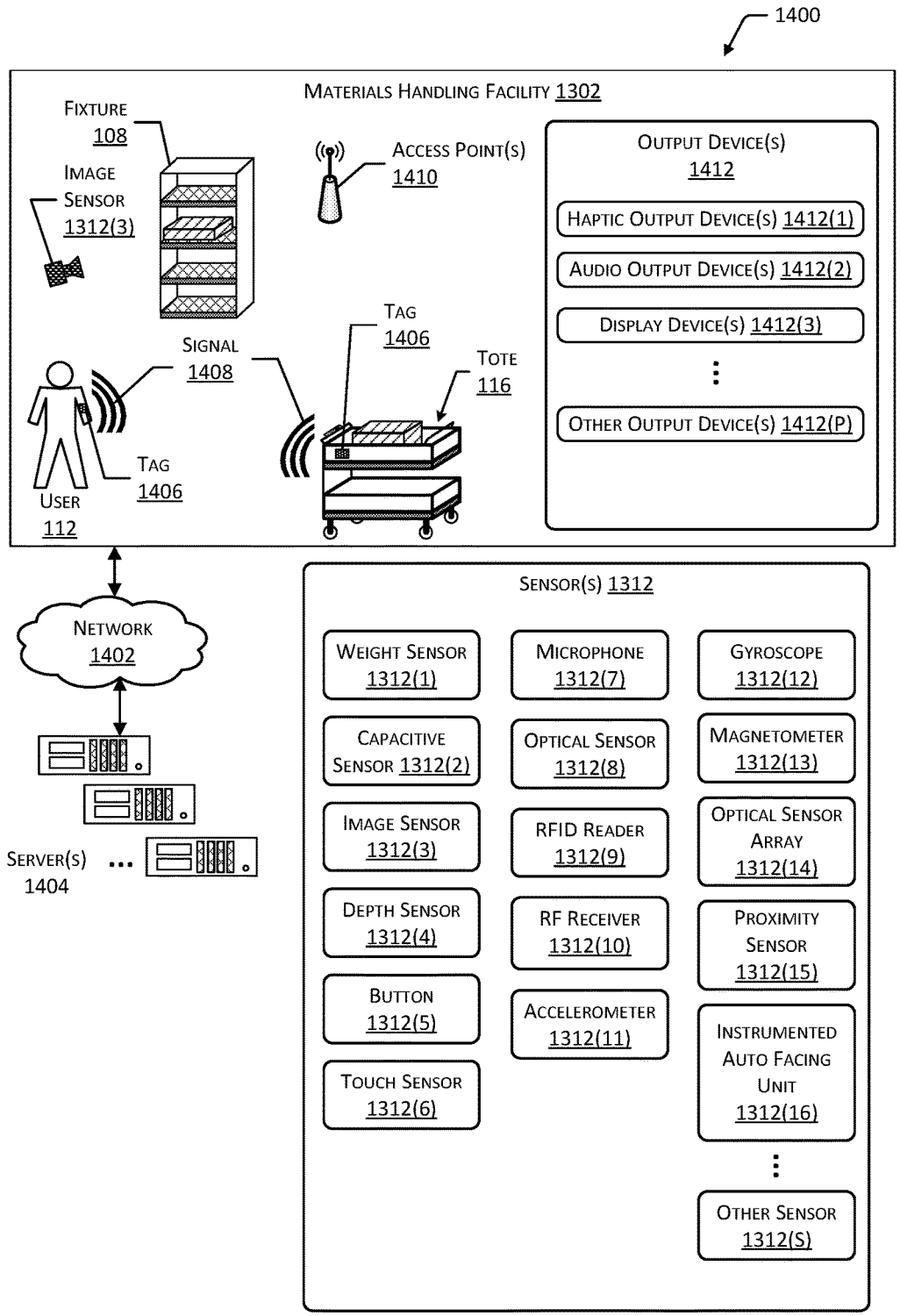
FIG. 14 is a block diagram illustrating additional details of the facility, according to some implementations.

FIG. 14 is a block diagram 1400 illustrating additional details of the facility 1302, according to some implementations. The facility 1302 may be connected to one or more networks 1402, which in turn connect to one or more servers 1404. The network 1402 may include private networks such as an institutional or personal intranet, public networks such as the Internet, or a combination thereof. The network 1402 may utilize wired technologies (e.g., wires, fiber optic cables, and so forth), wireless technologies (e.g., radio frequency, infrared, acoustic, optical, and so forth), or other connection technologies. The network 1402 is representative of any type of communication network, including one or more of data networks or voice networks. The network 1402 may be implemented using wired infrastructure (e.g., copper cable, fiber optic cable, and so forth), a wireless infrastructure (e.g., cellular, microwave, satellite, and so forth), or other connection technologies.

The servers 1404 may be configured to execute one or more modules or software applications associated with the inventory management system 130 or other systems. While the servers 1404 are illustrated as being in a location outside of the facility 1302, in other implementations, at least a portion of the servers 1404 may be located at the facility 1302. The servers 1404 are discussed in more detail below with regard to FIG. 15.

The users 112, the totes 116, or other objects in the facility 1302 may be equipped with one or more tags 1406. The tags 1406 may be configured to emit a signal 1408. In one implementation, the tag 1406 may be a RFID tag 1406 configured to emit a RF signal 1408 upon activation by an external signal. For example, the external signal may comprise a radio frequency signal or a magnetic field configured to energize or activate the RFID tag 1406. In another implementation, the tag 1406 may comprise a transmitter and a power source configured to power the transmitter. For example, the tag 1406 may comprise a Bluetooth Low Energy (BLE) transmitter and battery. In other implementations, the tag 1406 may use other techniques to indicate presence of the tag 1406. For example, an acoustic tag 1406 may be configured to generate an ultrasonic signal 1408, which is detected by corresponding acoustic receivers. In yet another implementation, the tag 1406 may be configured to emit an optical signal 1408.

The inventory management system 130 may be configured to use the tags 1406 for one or more of identification of the object, determining a location of the object, and so forth. For example, the users 112 may wear tags 1406, the totes 116 may have tags 1406 affixed, and so forth, which may be read and, based at least in part on signal strength, used to determine identity and location. In other implementations, such as described above, the users 112 may wear portable transmitters 804, the totes 116 may be equipped with a portable receiver 802, portable transmitter 804, and so forth. In some implementations, the two may be combined, such as tags 1406 and the use of a portable transmitter 804.

Generally, the inventory management system 130 or other systems associated with the facility 1302 may include any number and combination of input components, output components, and servers 1404.

The one or more sensors 1312 may be arranged at one or more locations within the facility 1302. For example, the sensors 1312 may be mounted on or within a floor 102, wall, at a ceiling, at fixture 108, on a tote 116, may be carried or worn by a user 112, and so forth.

The sensors 1312 may include one or more weight sensors 1312(1) that are configured to measure the weight of a load, such as the item 902, the tote 116, or other objects. The weight sensors 1312(1) may be configured to measure the weight of the load at one or more of the fixtures 108, the tote 116, on the floor 102 of the facility 1302, and so forth. For example, the shelf 904 may include a plurality of lanes or platforms, with one or more weight sensors 1312(1) beneath each one to provide weight sensor data about an individual lane or platform. The weight sensors 1312(1) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 1312(1) may operate as transducers that generate one or more signals based on an applied force, such as that of the load due to gravity. For example, the weight sensor 1312(1) may comprise a load cell having a strain gauge and a structural member that deforms slightly when weight is applied. By measuring a change in the electrical characteristic of the strain gauge, such as capacitance or resistance, the weight may be determined. In another example, the weight sensor 1312(1) may comprise a force sensing resistor (FSR). The FSR may comprise a resilient material that changes one or more electrical characteristics when compressed. For example, the electrical resistance of a particular portion of the FSR may decrease as the particular portion is compressed. The inventory management system 130 may use the data acquired by the weight sensors 1312(1) to identify an object, determine a change in the quantity of objects, determine a location of an object, maintain shipping records, and so forth.

The sensors 1312 may include capacitive sensors 1312(2). As described above with regard to FIG. 11, the capacitive sensor 1312(2) may comprise one or more conductive elements 1106 and the capacitance measurement/receiver module. In some implementations, the capacitive sensor 1312(2) may include or utilize a switch module 1112. The capacitive sensor 1312(2) may be configured to use a far-field capacitance effect that may comprise measuring the self-capacitance of the conductive elements 1106, rather than a mutual capacitance. In one implementation, a fixed charge may be provided to the conductive element 1106, and the resultant voltage may be measured between the conductive element 1106 and the ground.

In other implementations, the capacitive sensor 1312(2) may be configured to operate in a mutual capacitance mode, surface capacitance mode, and so forth. In mutual capacitance mode, at least two conductive layers are arranged in a stack with a dielectric material between the layers. The dielectric may be a solid, such as a plastic, a gas such as air, a vacuum, and so forth. The mutual capacitance at points between these layers is measured. When another object touches the outermost conductive layer, the mutual capacitance between the two layers changes, allowing for detection. In surface capacitance mode, voltages are applied to different points of a conductive element 1106 to produce an electrostatic field. By measuring the changes in current draw (or another electrical characteristic) from the different points at which voltage is applied, a location of an object may be determined.

The sensors 1312 may include one or more image sensors 1312(3). The one or more image sensors 1312(3) may include imaging sensors configured to acquire images of a scene. The image sensors 1312(3) are configured to detect light in one or more wavelengths including, but not limited to, terahertz, infrared, visible, ultraviolet, and so forth. The image sensors 1312(3) may comprise charge coupled devices (CCD), complementary metal oxide semiconductor (CMOS) devices, microbolometers, and so forth. The inventory management system 130 may use image data acquired by the image sensors 1312(3) during operation of the facility 1302. For example, the inventory management system 130 may identify items 902, users 112, totes 116, and so forth, based at least in part on their appearance within the image data acquired by the image sensors 1312(3). The image sensors 1312(3) may be mounted in various locations within the facility 1302. For example, image sensors 1312(3) may be mounted overhead, on the fixtures 108, may be worn or carried by users 112, may be affixed to totes 116, and so forth.

One or more depth sensors 1312(4) may also be included in the sensors 1312. The depth sensors 1312(4) are configured to acquire spatial or three-dimensional (3D) data, such as depth information, about objects within a FOV. The depth sensors 1312(4) may include range cameras, lidar systems, sonar systems, radar systems, structured light systems, stereo vision systems, optical interferometry systems, and so forth. The inventory management system 130 may use the 3D data acquired by the depth sensors 1312(4) to identify objects, determine a location of an object in 3D real space, and so forth.

One or more buttons 1312(5) may be configured to accept input from the user 112. The buttons 1312(5) may comprise mechanical, capacitive, optical, or other mechanisms. For example, the buttons 1312(5) may comprise mechanical switches configured to accept an applied force from a touch of the user 112 to generate an input signal. The inventory management system 130 may use data from the buttons 1312(5) to receive information from the user 112. For example, the tote 116 may be configured with a button 1312(5) to accept input from the user 112 and send information indicative of the input to the inventory management system 130.

The sensors 1312 may include one or more touch sensors 1312(6). The touch sensors 1312(6) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 130 may use data from the touch sensors 1312(6) to receive information from the user 112. For example, the touch sensor 1312(6) may be integrated with the tote 116 to provide a touchscreen with which the user 112 may select from a menu one or more particular items 902 for picking, enter a manual count of items 902 at a fixture 108, and so forth.

One or more microphones 1312(7) may be configured to acquire information indicative of sound present in the environment. In some implementations, arrays of microphones 1312(7) may be used. These arrays may implement beamforming techniques to provide for directionality of gain. The inventory management system 130 may use the one or more microphones 1312(7) to acquire information from acoustic tags 1406, accept voice input from the users 112, determine ambient noise level, and so forth.

The sensors 1312 may include one or more optical sensors 1312(8). The optical sensors 1312(8) may be configured to provide data indicative of one or more of color or intensity of light impinging thereupon. For example, the optical sensor 1312(8) may comprise a photodiode and associated circuitry configured to generate a signal or data indicative of an incident flux of photons. As described below, the optical sensor array 1312(14) may comprise a plurality of the optical sensors 1312(8). For example, the optical sensor array 1312(14) may comprise an array of ambient light sensors such as the ISL76683 as provided by Intersil Corporation of Milpitas, Calif., USA, or the MAX44009 as provided by Maxim Integrated of San Jose, Calif., USA. In other implementations, other optical sensors 1312(8) may be used. The optical sensors 1312(8) may be sensitive to one or more of infrared light, visible light, or ultraviolet light. For example, the optical sensors 1312(8) may be sensitive to infrared light, and infrared light sources such as light emitting diodes (LEDs) may provide illumination.

The optical sensors 1312(8) may include photodiodes, photoresistors, photovoltaic cells, quantum dot photoconductors, bolometers, pyroelectric infrared detectors, and so forth. For example, the optical sensor 1312(8) may use germanium photodiodes to detect infrared light.

One or more radio frequency identification (RFID) readers 1312(9), near field communication (NFC) systems, and so forth, may be included as sensors 1312. For example, the RFID readers 1312(9) may be configured to read the RF tags 1406. Information acquired by the RFID reader 1312(9) may be used by the inventory management system 130 to identify an object associated with the RF tag 1406 such as the item 902, the user 112, the tote 116, and so forth. For example, based on information from the RFID readers 1312(9) detecting the RF tag 1406 at different times and RFID readers 1312(9) having different locations in the facility 1302, a velocity of the RF tag 1406 may be determined.

One or more RF receivers 1312(10) may also be included as sensors 1312. In some implementations, the RF receivers 1312(10) may be part of transceiver assemblies. The RF receivers 1312(10) may be configured to acquire RF signals 1408 associated with Wi-Fi, Bluetooth, ZigBee, 4G, 3G, LTE, or other wireless data transmission technologies. The RF receivers 1312(10) may provide information associated with data transmitted via radio frequencies, signal strength of RF signals 1408, and so forth. For example, information from the RF receivers 1312(10) may be used by the inventory management system 130 to determine a location of an RF source, such as a communication interface onboard the tote 116.

The sensors 1312 may include one or more accelerometers 1312(11), which may be worn or carried by the user 112, mounted to the tote 116, and so forth. The accelerometers 1312(11) may provide information such as the direction and magnitude of an imposed acceleration. Data such as rate of acceleration, determination of changes in direction, speed, and so forth, may be determined using the accelerometers 1312(11).

A gyroscope 1312(12) may provide information indicative of rotation of an object affixed thereto. For example, the tote 116 or other objects may be equipped with a gyroscope 1312(12) to provide data indicative of a change in orientation of the object.

A magnetometer 1312(13) may be used to determine an orientation by measuring ambient magnetic fields, such as the terrestrial magnetic field. The magnetometer 1312(13) may be worn or carried by the user 112, mounted to the tote 116, and so forth. For example, the magnetometer 1312(13) mounted to the tote 116 may act as a compass and provide information indicative of which direction the tote 116 is oriented.

An optical sensor array 1312(14) may comprise one or more optical sensors 1312(8). The optical sensors 1312(8) may be arranged in a regular, repeating, or periodic two-dimensional arrangement such as a grid. The optical sensor array 1312(14) may generate image data. For example, the optical sensor array 1312(14) may be arranged within or below fixture 108 and obtain information about shadows of items 902, a hand 1002 of the user 112, and so forth.

The sensors 1312 may include proximity sensors 1312(15) used to determine presence of an object, such as the user 112, the tote 116, and so forth. The proximity sensors 1312(15) may use optical, electrical, ultrasonic, electromagnetic, or other techniques to determine a presence of an object. In some implementations, the proximity sensors 1312(15) may use an optical emitter and an optical detector to determine proximity. For example, an optical emitter may emit light, a portion of which may then be reflected by the object back to the optical detector to provide an indication that the object is proximate to the proximity sensor 1312(15). In other implementations, the proximity sensors 1312(15) may comprise a capacitive proximity sensor 1312(15) configured to provide an electrical field and determine a change in electrical capacitance due to presence or absence of an object within the electrical field.

The proximity sensors 1312(15) may be configured to provide sensor data indicative of one or more of a presence or absence of an object, a distance to the object, or characteristics of the object. An optical proximity sensor 1312(15) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a sensor 1312 such as an image sensor 1312(3). Based on an apparent distance between the features of the structured light pattern, the distance to the object may be calculated. Other techniques may also be used to determine distance to the object. In another example, the color of the reflected light may be used to characterize the object, such as skin, clothing, tote 116, and so forth.

The sensors 1312 may also include an instrumented auto-facing unit (IAFU) 1312(16). The IAFU 1312(16) may comprise a position sensor configured to provide data indicative of displacement of a pusher. As an item 902 is removed from the IAFU 1312(16), the pusher moves, such as under the influence of a spring, and pushes the remaining items 902 in the IAFU 1312(16) to the front of the fixture 108. By using data from the position sensor, and given item data such as a depth of an individual item 902, a count may be determined, based on a change in position data. For example, if each item 902 is 1 inch deep, and the position data indicates a change of 17 inches, the quantity held by the IAFU 1312(16) may have changed by 17 items 902. This count information may be used to confirm or provide a cross check for a count obtained by other means, such as analysis of the weight data 1130, the capacitance data 1116, the image data 1532, and so forth.

The sensors 1312 may include other sensors 1312(S) as well. For example, the other sensors 1312(S) may include light curtains, ultrasonic rangefinders, thermometers, barometric sensors, air pressure sensors, hygrometers, and so forth. For example, the inventory management system 130 may use information acquired from thermometers and hygrometers in the facility 1302 to direct the user 112 to check on delicate items 902 stored in a particular fixture 108, which is overheating, too dry, too damp, and so forth.

In one implementation, a light curtain may utilize a linear array of light emitters and a corresponding linear array of light detectors. For example, the light emitters may comprise a line of infrared LEDs or vertical cavity surface emitting lasers (VCSELs) that are arranged in front of the fixture 108, while the light detectors comprise a line of photodiodes sensitive to infrared light arranged below the light emitters. The light emitters produce a "lightplane" or sheet of infrared light that is then detected by the light detectors. An object passing through the lightplane may decrease the amount of light falling upon the light detectors. For example, the user's 112 hand 1002 would prevent at least some of the light from light emitters from reaching a corresponding light detector. As a result, a position along the linear array of the object may be determined that is indicative of a touchpoint. This position may be expressed as touchpoint data, with the touchpoint being indicative of the intersection between the hand 1002 of the user 112 and the sheet of infrared light. In some implementations, a pair of light curtains may be arranged at right angles relative to one another to provide two-dimensional touchpoint data indicative of a position of touch in a plane. Input from the light curtain, such as indicating occlusion from a hand 1002 of a user 112 may be used to generate interaction data 142.

In some implementations, the image sensor 1312(3) or other sensors 1312(S) may include hardware processors, memory, and other elements configured to perform various functions. For example, the image sensors 1312(3) may be configured to generate image data 1532, send the image data 1532 to another device such as the server 1404, and so forth.

The facility 1302 may include one or more access points 1410 configured to establish one or more wireless networks. The access points 1410 may use Wi-Fi, NFC, Bluetooth, or other technologies to establish wireless communications between a device and the network 1402. The wireless networks allow devices to communicate with one or more of the sensors 1312, the inventory management system 130, the optical sensor arrays 1312(14), the tag 1406, a communication device of the tote 116, or other devices.

Output devices 1412 may also be provided in the facility 1302. The output devices 1412 are configured to generate signals, which may be perceived by the user 112 or detected by the sensors 1312. In some implementations, the output devices 1412 may be used to provide illumination of the optical sensor array 1312(14).

Haptic output devices 1412(1) are configured to provide a signal that results in a tactile sensation to the user 112. The haptic output devices 1412(1) may use one or more mechanisms such as electrical stimulation or mechanical displacement to provide the signal. For example, the haptic output devices 1412(1) may be configured to generate a modulated electrical signal, which produces an apparent tactile sensation in one or more fingers of the user 112. In another example, the haptic output devices 1412(1) may comprise piezoelectric or rotary motor devices configured to provide a vibration, which may be felt by the user 112.

One or more audio output devices 1412(2) may be configured to provide acoustic output. The acoustic output includes one or more of infrasonic sound, audible sound, or ultrasonic sound. The audio output devices 1412(2) may use one or more mechanisms to generate the acoustic output. These mechanisms may include, but are not limited to, the following: voice coils, piezoelectric elements, magnetorestrictive elements, electrostatic elements, and so forth. For example, a piezoelectric buzzer or a speaker may be used to provide acoustic output.

The display devices 1412(3) may be configured to provide output, which may be seen by the user 112 or detected by a light-sensitive sensor such as an image sensor 1312(3) or an optical sensor 1312(8). In some implementations, the display devices 1412(3) may be configured to produce output in one or more of infrared, visible, or ultraviolet light. The output may be monochrome or in color. The display devices 1412(3) may be one or more of emissive, reflective, microelectromechanical, and so forth. An emissive display device 1412(3), such as using LEDs, is configured to emit light during operation. In comparison, a reflective display device 1412(3), such as using an electrophoretic element, relies on ambient light to present an image. Backlights or front lights may be used to illuminate non-emissive display devices 1412(3) to provide visibility of the output in conditions where the ambient light levels are low.

The display devices 1412(3) may be located at various points within the facility 1302. For example, the addressable displays may be located on the fixtures 108, totes 116, on the floor of the facility 1302, and so forth.

Other output devices 1412(P) may also be present. For example, the other output devices 1412(P) may include scent/odor dispensers, document printers, 3D printers or fabrication equipment, and so forth.

Figure 15:
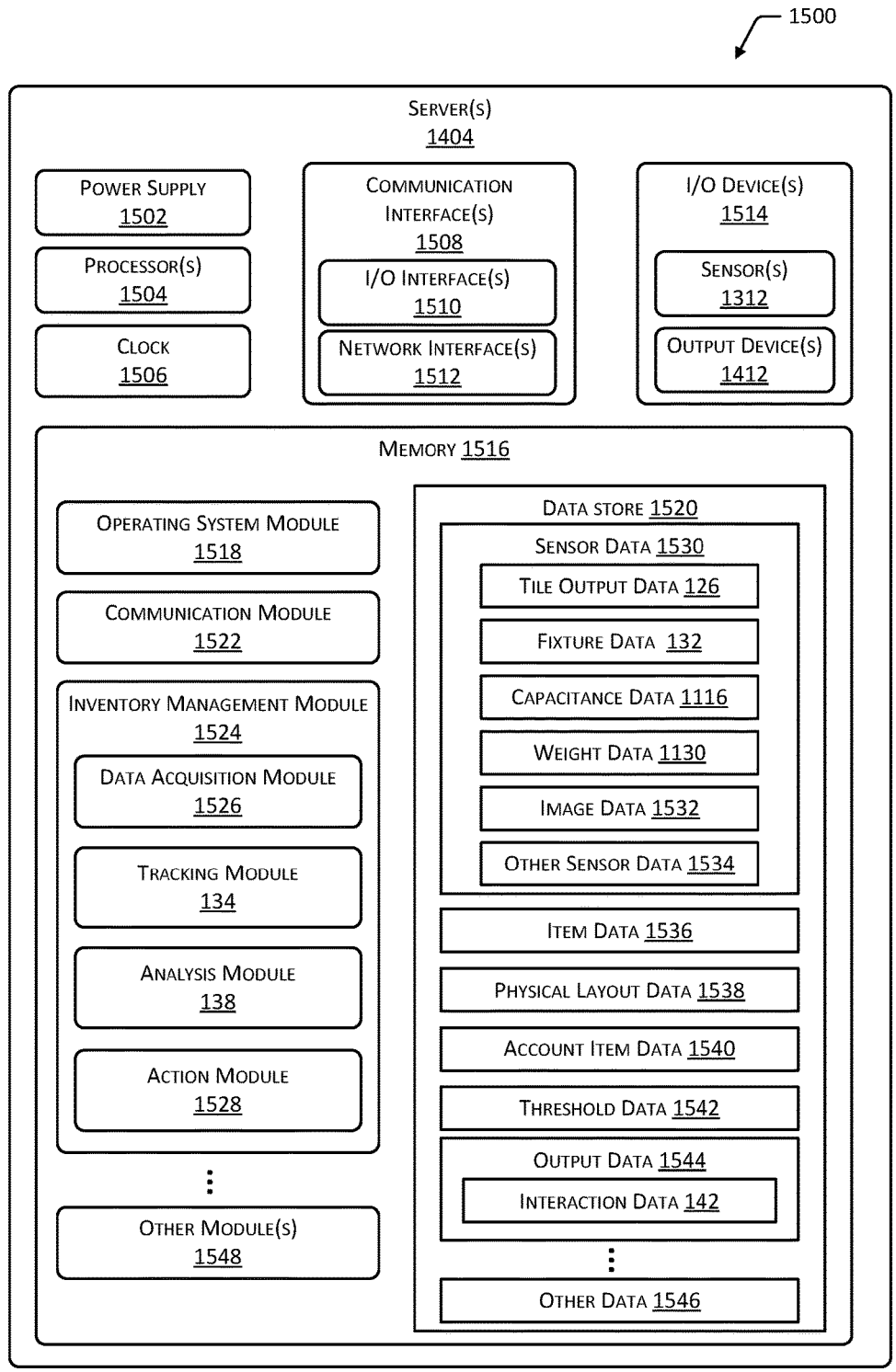
FIG. 15 is a block diagram of a server to support operation of the facility, according to some implementations.

FIG. 15 illustrates a block diagram 1500 of a server 1404 configured to support operation of the facility 1302, according to some implementations. The server 1404 may be physically present at the facility 1302, may be accessible by the network 1402, or a combination of both. The server 1404 does not require end-user knowledge of the physical location and configuration of the system that delivers the services. Common expressions associated with the server 1404 may include "on-demand computing", "software as a service (SaaS)", "platform computing", "network-accessible platform", "cloud services", "data centers", and so forth. Services provided by the server 1404 may be distributed across one or more physical or virtual devices.

One or more power supplies 1502 may be configured to provide electrical power suitable for operating the components in the server 1404. The one or more power supplies 1502 may comprise batteries, capacitors, fuel cells, photovoltaic cells, wireless power receivers, conductive couplings suitable for attachment to an external power source such as provided by an electric utility, and so forth. The server 1404 may include one or more hardware processors 1504 (processors) configured to execute one or more stored instructions. The processors 1504 may comprise one or more cores. One or more clocks 1506 may provide information indicative of date, time, ticks, and so forth. For example, the processor 1504 may use data from the clock 1506 to associate a particular interaction with a particular point in time.

The server 1404 may include one or more communication interfaces 1508 such as input/output (I/O) interfaces 1510, network interfaces 1512, and so forth. The communication interfaces 1508 enable the server 1404, or components thereof, to communicate with other devices or components. The communication interfaces 1508 may include one or more I/O interfaces 1510. The I/O interfaces 1510 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 1510 may couple to one or more I/O devices 1514. The I/O devices 1514 may include input devices such as one or more of a sensor 1312, keyboard, mouse, scanner, and so forth. The I/O devices 1514 may also include output devices 1412 such as one or more of a display device 1412(3), printer, audio speakers, and so forth. In some embodiments, the I/O devices 1514 may be physically incorporated with the server 1404 or may be externally placed.

The network interfaces 1512 may be configured to provide communications between the server 1404 and other devices, such as the SFTs 104, totes 116, routers, access points 1410, and so forth. The network interfaces 1512 may include devices configured to couple to personal area networks (PANs), local area networks (LANs), wireless local area networks (WLANS), wide area networks (WANs), and so forth. For example, the network interfaces 1512 may include devices compatible with Ethernet, Wi-Fi, Bluetooth, ZigBee, and so forth.

The server 1404 may also include one or more busses or other internal communications hardware or software that allow for the transfer of data between the various modules and components of the server 1404.

As shown in FIG. 15, the server 1404 includes one or more memories 1516. The memory 1516 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 1516 provides storage of computer-readable instructions, data structures, program modules, and other data for the operation of the server 1404. A few example functional modules are shown stored in the memory 1516, although the same functionality may alternatively be implemented in hardware, firmware, or as a system on a chip (SoC).

The memory 1516 may include at least one operating system (OS) module 1518. The OS module 1518 is configured to manage hardware resource devices such as the I/O interfaces 1510, the I/O devices 1514, the communication interfaces 1508, and provide various services to applications or modules executing on the processors 1504. The OS module 1518 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 1516 may be a data store 1520 and one or more of the following modules. These modules may be executed as foreground applications, background tasks, daemons, and so forth. The data store 1520 may use a flat file, database, linked list, tree, executable code, script, or other data structure to store information. In some implementations, the data store 1520 or a portion of the data store 1520 may be distributed across one or more other devices including the servers 1404, network attached storage devices, and so forth.

A communication module 1522 may be configured to establish communications with one or more of the totes 116, sensors 1312, display devices 1412(3), other servers 1404, or other devices. The communications may be authenticated, encrypted, and so forth.

The memory 1516 may store an inventory management module 1524. The inventory management module 1524 is configured to provide the inventory functions as described herein with regard to the inventory management system 130. For example, the inventory management module 1524 may track items 902 between different fixtures 108, to and from the totes 116, and so forth.

The inventory management module 1524 may include one or more of a data acquisition module 1526, the tracking module 134, the analysis module 138, an action module 1528, and so forth. The data acquisition module 1526 may be configured to acquire and access information associated with operation of the facility 1302. For example, the data acquisition module 1526 may be configured to acquire tile output data 126 from the SFTs 104, fixture data 132, sensor data 1530 such as the weight data 1130, capacitance data 1116, image data 1532, other sensor data 1534, and so forth. The sensor data 1530 may be accessed by the other modules for use.

The data store 1520 may also store item data 1536. The item data 1536 provides information about a particular type of item 902, including characteristics of that type of item 902 such as physical dimensions, where that type of item 902 is located in the facility 1302, characteristics about how the item 902 appears, capacitance values associated with the type of item 902, attenuation characteristics of an EMS 106, and so forth. For example, the item data 1536 may indicate that the type of item 902 is "Bob's Low Fat Baked Beans, 10 oz can" with a stock keeping unit number of "24076513". The item data 1536 may indicate the types and quantities of items 902 that are expected to be stored at that particular fixture 108 such as in a particular lane on a shelf 904, width and depth of that type of item 902, weight of the item 902 individually or in aggregate, sample images of the type of item 902, and so forth.

The item data 1536 may include an item identifier. The item identifier may be used to distinguish one type of item 902 from another. For example, the item identifier may include a stock keeping unit (SKU) string, Universal Product Code (UPC) number, radio frequency identification (RFID) tag data, and so forth. The items 902 that are of the same type may be referred to by the same item identifier. For example, cans of beef flavor Brand X dog food may be represented by the item identifier value of "9811901181". In other implementations, non-fungible items 902 may each be provided with a unique item identifier, allowing each to be distinguished from one another.

The item data 1536 may include one or more of geometry data, item weight data, sample image data, sample capacitance data, or other data. The geometry data may include information indicative of size and shape of the item 902 in one-, two-, or three-dimensions. For example, the geometry data may include the overall shape of an item 902, such as a cuboid, sphere, cylinder, and so forth. The geometry data may also include information such as length, width, depth, and so forth, of the item 902. Dimensional information in the geometry data may be measured in pixels, centimeters, inches, arbitrary units, and so forth. The geometry data may be for a single item 902, or a package, kit, or other grouping considered to be a single item 902.

The item weight data comprises information indicative of a weight of a single item 902, or a package, kit, or other grouping considered to be a single item 902. The item data 1536 may include other data. For example, the other data may comprise weight distribution of the item 902, point cloud data for the item 902, and so forth.

The sample capacitance data may comprise data indicative of a previously measured or calculated change in capacitance obtained by a representative capacitive sensor 1312(2) based on the presence or absence of a sample of the type of item 902. For example, during processing or intake of the item 902 at the facility 1302, a sample of the type of item 902 may be placed on a capacitive sensor 1312(2) to generate the sample capacitance data. Similar data may be obtained for the attenuation or propagation of the EMS 106 across the item 902.

The sample image data may comprise one or more images of one or more of that type of item 902. For example, sample image data may be obtained during processing or intake of the item 902 to be used by the facility 1302.

The item data 1536 may include one or more fixture identifiers (IDs). The fixture ID is indicative of a particular area or volume of fixture 108 such as a shelf 904 that is designated for stowage of the type of item 902. For example, a single shelf 904 may have several lanes, each with a different fixture ID. Each of the different fixture IDs may be associated with a lane having a particular area on the shelf 904 designated for storage of a particular type of item 902. A single type of item 902 may be associated with a particular fixture ID, a plurality of fixture IDs may be associated with the single type of item 902, more than one type of item 902 may be associated with the particular fixture ID, and so forth.

The item data 1536 may also include quantity data. The quantity data may comprise a count or value indicative of a number of items 902. The count may be a measured or an estimated value. The quantity data may be associated with a particular fixture ID, for an entire facility 1302, and so forth. For example, the same type of item 902 may be stored at different shelves 904 within the facility 1302. The quantity data may indicate the quantity on hand for each of the different fixtures 108.

The tracking module 134 may access physical layout data 1538 and generate account item data 1540. The tracking module 134 may be configured to determine a location within the facility 1302 of the user 112, a user account associated with the user 112, and so forth. For example, the tracking module 134 may determine that an item 902 has been removed from a lane and placed into the tote 116 based on the fixture data 132 indicative of the user's 112 characteristic data 128 having been received at the lane. The tracking module 134 may then determine that the tote 116 is associated with the user 112 or the user account that represents the user 112. Based on this information, the analysis module 138 may generate the interaction data 142.

The analysis module 138 may utilize the tile output data 126, fixture data 132, weight data 1130, capacitance data 1116, item data 1536, and other information to generate interaction data 142. The interaction data 142 is indicative of action such as picking or placing an item 902 for a particular fixture 108, presence of the user 112 at the fixture 108, and so forth.

In some implementations, the analysis module 138 may generate output data 1544 about the user 112. The analysis module 138 may determine if the user 112 is standing, moving, lying on the floor 102, and so forth. For example, the analysis module 138 may determine an area of contact with the floor 102 based on the tile output data 126. If the area of contact exceeds a threshold value, the user 112 may be determined to be lying on the floor 102. Based on this determination, other actions may be taken. For example, alarm data may be generated to summon assistance if a user 112 is deemed to be lying on the floor 102.

The analysis module 138, or other modules, may be configured to determine portions of the SFTs 104 which are to be deactivated or from which information is to be disregarded. In one implementation, during setup of the system, the antennas 304 of a SFT 104 that are located underneath a fixture 108 may be deactivated. In another implementation, the analysis module 138 may determine SFTs 104 or portions thereof that report presence of an object that is unchanging over long periods of time, such as hours or days. These objects, such as a fixture 108 above the SFT 104, may then be subsequently disregarded and information about these positions may be removed from further processing. If a change is detected, such as when the fixture 108 above the SFT 104 is moved, information about that change may be used to re-enable consideration of data from that SFT 104 or portion thereof.

The inventory management module 1524 may utilize the physical layout data 1538. The physical layout data 1538 may provide information indicative of location of the SFTs 104, where sensors 1312 and the fixtures 108 are in the facility 1302 with respect to one another, FOV of sensors 1312 relative to the fixture 108, and so forth. For example, the physical layout data 1538 may comprise information representative of a map or floor plan of the facility 1302 with relative positions of the fixtures 108, location of individual SFTs 104 therein, arrangements of the segments 204, planogram data indicative of how items 902 are to be arranged at the fixtures 108, and so forth. Continuing the example, the physical layout data 1538 may be based on using the relative arrangement of the SFTs 104 in conjunction with their physical dimensions to specify where the SFTs 104 are placed within the facility 1302.

The physical layout data 1538 may associate a particular fixture ID with other information such as physical location data, sensor position data, sensor direction data, sensor identifiers, and so forth. The physical location data provides information about where in the facility 1302 objects are, such as the fixture 108, the sensors 1312, and so forth. In some implementations, the physical location data may be relative to another object. For example, the physical location data may indicate that a particular weight sensor 1312(1), capacitive sensor 1312(2), or image sensor 1312(3) is associated with the shelf 904 or portion thereof.

The inventory management module 1524 may utilize the physical layout data 1538 and other information during operation. For example, the tracking module 134 may utilize physical layout data 1538 to determine what capacitance data 1116 acquired from particular capacitive sensors 1312(2) corresponds to a particular shelf 904, lane, or other fixture 108.

The tracking module 134 may access information from sensors 1312 within the facility 1302, such as those at the shelf 904 or other fixture 108, onboard the tote 116, carried by or worn by the user 112, and so forth. For example, the tracking module 134 may receive the fixture data 132 and use the characteristic data 128 to associate a particular user 112 with a pick or place of an item 902 at the associated fixture 108.

The account item data 1540 may also be included in the data store 1520 and comprises information indicative of one or more items 902 that are within the custody of a particular user 112, within a particular tote 116, and so forth. For example, the account item data 1540 may comprise a list of the contents of the tote 116. Continuing the example, the list may be further associated with the user account representative of the user 112. In another example, the account item data 1540 may comprise a list of items 902 that the user 112 is carrying. The tracking module 134 may use the account item data 1540 to determine subsets of possible items 902 with which the user 112 may have interacted.

The inventory management module 1524, and modules associated therewith, may access sensor data 1530, threshold data 1542, and so forth. The threshold data 1542 may comprise one or more thresholds, ranges, percentages, and so forth, that may be used by the various modules in operation.

The inventory management module 1524 may generate output data 1544. For example, the output data 1544 may include the interaction data 142, inventory levels for individual types of items 902, overall inventory, and so forth.

The action module 1528 may be configured to initiate or coordinate one or more actions responsive to output data 1544. For example, the action module 1528 may access output data 1544 that indicates a particular fixture 108 is empty and in need of restocking. An action such as a dispatch of a work order or transmitting instructions to a robot may be performed to facilitate restocking of the fixture 108.

Processing sensor data 1530, such as the image data 1532, may be performed by a module implementing, at least in part, one or more of the following tools or techniques. In one implementation, processing of the image data 1532 may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 1530. In still another implementation, functions such as those in the Machine Vision Toolbox for Matlab (MVTB) available using MATLAB as developed by MathWorks, Inc. of Natick, Mass., USA, may be utilized.

Techniques such as artificial neural networks (ANNs), active appearance models (AAMs), active shape models (ASMs), principal component analysis (PCA), cascade classifiers, and so forth, may also be used to process the sensor data 1530 or other data. For example, the ANN may be a trained using a supervised learning algorithm such that object identifiers are associated with images of particular objects within training images provided to the ANN. Once trained, the ANN may be provided with the sensor data 1530 and the item data 1536 to allow for a determination of similarity between two or more images.

The sensor data 1530 obtained from different sensors 1312 may be used to compare or validate output data 1544. For example, the image data 1532 may indicate the presence of a person based on a coat or jacket that is arranged across the back of a chair. However, the tile output data 126 provides information that no user 112 is currently present at that location in the facility 1302. This difference may be used to generate an alarm, notify an associate in the facility 1302, and so forth.

Other data 1546 may be stored in the data store 1520 as well as other modules 1548 in the memory 1516. For example, the other modules 1548 may include a billing module while the other data 1546 may include billing data.

Figure 16:
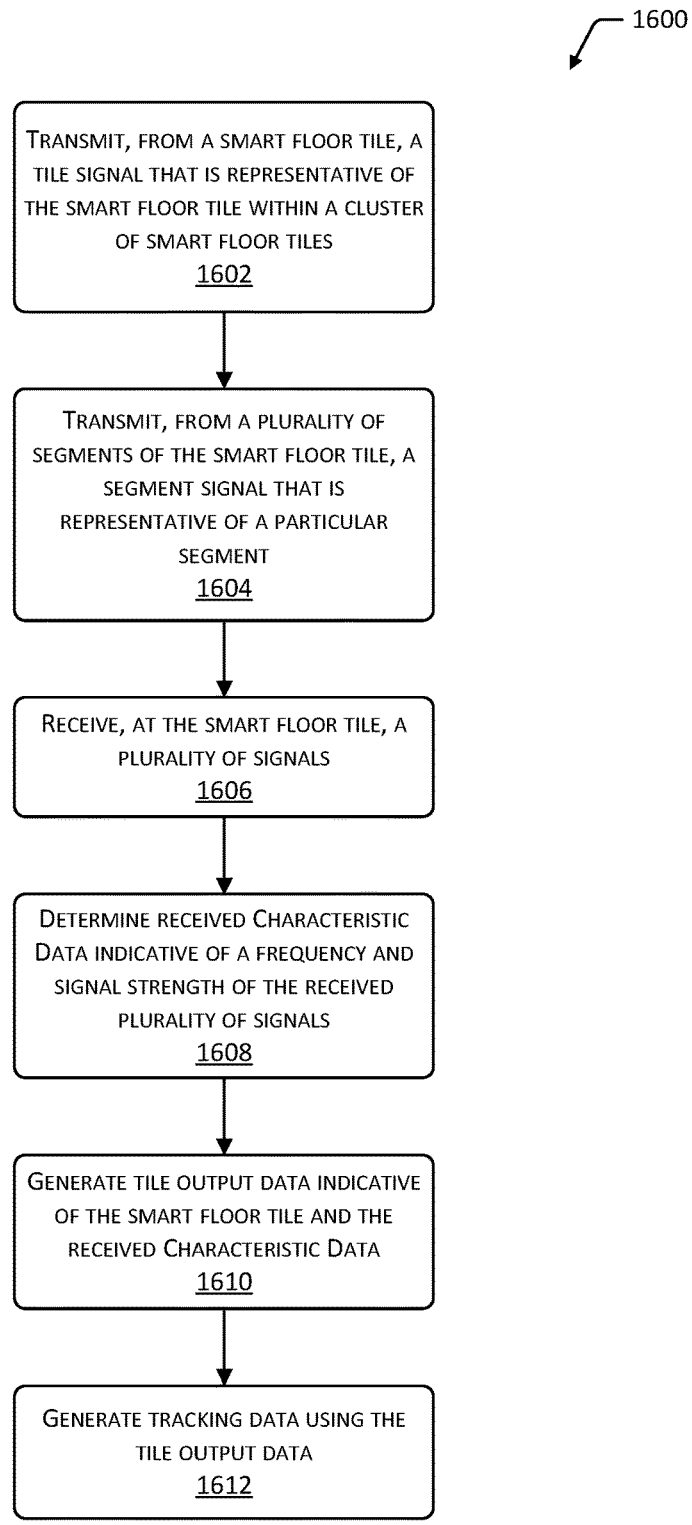
FIG. 16 depicts a flow diagram of a process of using smart floor tiles to generate tracking data, according to some implementations.

FIG. 16 depicts a flow diagram 1600 of a process for using SFTs 104 to generate tracking data 136, according to some implementations.

At 1602, a SFT 104 transmits a tile signal 206. As described above, the tile signal 206 is representative of the SFT 104 within the cluster 202.

At 1604, the SFT 104 transmits segment signals 208 from the segments 204 of the SFT 104. As described above, the segment signals 208 are representative of particular segments 204 within the SFT 104.

For example, a transmitted plurality of EMS 106 that are transmitted from a plurality of SFTs 104 may include the tile signal 206 at a first frequency and a plurality of segment signals 208 at frequencies different from one another.

At 1606, a plurality of EMS 106 are received using one or more receivers 326 of at least a portion of the plurality of SFTs 104.

At 1608, received characteristic data 128 is determined using the received plurality of EMS 106. As described above, the characteristic data 128 is indicative of a frequency and signal strength of the received plurality of signals.

At 1610, tile output data 126 is generated that is indicative of a particular SFT 104 and the received characteristic data 128 obtained by that particular SFT 104. For example, the tile output data 126 may include tile identifier data 334.

At 1612, tracking data 136 is generated using the tile output data 126. For example, the locations of the user 112 at different times may be generated based on the tile output data 126, and a time series created that represents these different locations at their respective times. The tracking data 136 may be based on the reciprocity of EMS 106 exchanged between the feet of the user 112.

For example, first received characteristic data 128 received at a first SFT 104 may be determined. The first received characteristic data 128 is indicative of the transmitted plurality of EMS 106 from the second SFT 104. Second received characteristic data 128 received at the second SFT 104 may be determined. The second received characteristic data 128 is indicative of the transmitted plurality of EMS 106 from the first SFT 104. Thus, there is reciprocity between the two SFTs 104 and the respective characteristic data 128. The tracking data 136 may then be generated that is indicative of a location of the user 112 at the first SFT 104 and the second SFT 104, or a location relative thereto. Continuing the example, the tracking data 136 may indicate allocation that is at a midpoint between the left foot and the right foot of the user 112.

As described above, the tracking data 136 may be based on the pairwise presence of two feet at different locations. For example, a first pair of SFTs 104 having respective tile output data 126 indicative of contemporaneous transmission of their respective transmitted plurality of EMS 106 at a first time may be determined. A first location of an object (such as the user 112) may be determined at the first time using a location of the SFTs 104 in the first pair. A second pair of SFTs 104 that have respective tile output data 126 indicative of contemporaneous transmission of their respective transmitted plurality of EMS 106 at a second time may be determined. The second pair includes one of the SFTs 104 of the first pair. A second location of an object is determined at the second time using a location of the SFTs in the second pair. Tracking data 136 indicative of a change in location of the object from the first location at the first time to the second location at the second time may then be generated.

As described above with regard to FIG. 12, the location of a hand 1002 relative to a fixture 108, or portion thereof such as a shelf 904, may be determined using the EMS 106. One or more receivers 326 having a plurality of antennas 304 installed at a fixture 108 may be used to receive a plurality of EMS 106. Using received signal strength of at least a portion of the plurality of EMS 106 as acquired using the plurality of antennas 304 installed at the fixture 108, a position of an object with respect to the fixture 108 may be determined. For example, as described above, given a known arrangement of the antennas 304 and a received signal strength 504, a location may be determined. The object provides a signal path 402 for the plurality of EMS 106 to be transferred between the SFT 104 and the fixture 108. Shelf received characteristic data 128 may be determined that is indicative of the plurality of EMS 106 and the respective signal strengths of individual signals therein. A user account associated with the shelf received characteristic data 128 may be determined, and associated with the action being taken. For example, the received characteristic data 128 may be compared with information that associates a particular set of characteristic data, that is a particular combination of signals, with the user 112. Interaction data 142 indicative of the interaction of the user 112 with the fixture 108 at the particular location may then be generated. For example, the interaction data 142 may indicate that user 112 "John Adams" picked an item 902 from a particular place on the shelf 904.

The system described above may be utilized in a variety of different settings including but not limited to commercial, non-commercial, medical, and so forth. For example, the SFTs 104 may be deployed in a home, hospital, care facility, correctional facility, transportation facility, office, and so forth. The tracking module 134 may provide tracking data 136, such as the location of users 112 within the facility. In some implementations, the tracking module 134 may provide tracking data 136 that is indicative of the identity of a particular user. The analysis module 138 may be used to generate output data 1544 that is indicative of a status of the user 112, such as whether the user 112 is standing, sitting, lying on the floor, and so forth.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A smart floor tile divided into at least a first segment and a second segment comprising:
    the at least the first segment and the second segment;
    a first transmitter of the first segment to generate a first segment signal at a first frequency;
    a first segment antenna of the first segment to radiate the first segment signal;
    a second transmitter of the second segment to generate a second segment signal at a second frequency;
    a second segment antenna of the second segment to radiate the second segment signal;
    a tile transmitter to generate a tile signal at a third frequency, wherein the first segment antenna and the second segment antenna are configured to radiate the tile signal;
    a receiver connected to the first segment antenna and the second segment antenna;
    a controller area network bus interface;
    a memory, storing computer-executable instructions; and
    a hardware processor to execute the computer-executable instructions to:
    generate tile output data indicative of tile signals and segment signals received by the receiver.

2. The smart floor tile of claim 1, wherein an active portion of the first segment antenna is a square having an area of between one square inch and sixteen square inches.

3. The smart floor tile of claim 1, wherein the first segment signal, the second segment signal, and the tile signal exhibit sinusoidal waveforms and are transmitted at a fixed carrier frequency of between 20 kilohertz and 15 megahertz, with the first frequency, the second frequency, and the third frequency being different from one another.

4. A system comprising:
    a smart floor tile divided into at least a first segment and a second segment, the smart floor tile comprising:
    a first segment antenna for the first segment;
    a second segment antenna for the second segment;
    one or more segment transmitters to generate a first segment signal at a first frequency and a second segment signal at a second frequency different from the first frequency, wherein the first segment antenna is configured to radiate the first segment signal and the second segment antenna is configured to radiate the second segment signal;
    a tile transmitter to generate a tile signal at a third frequency that is different from the first frequency and the second frequency, wherein the first segment antenna and the second segment antenna are configured to radiate the tile signal;
    a receiver connected to one or more of the first segment antenna and the second segment antenna; and
    a hardware processor to execute computer-executable instructions to generate tile output data indicative of tile signals and segment signals received by the receiver.

5. The system of claim 4, wherein each of the first segment antenna and the second segment antenna have an area of between one square inch and sixteen square inches.

6. The system of claim 4, wherein the first segment signal, the second segment signal, and the tile signal are unmodulated and exhibit a continuous sinusoidal waveform.

7. The system of claim 4, further comprising:
a second smart floor tile divided into at least a third segment and a fourth segment, the second smart floor tile comprising:
a third segment antenna for the third segment;
a fourth segment antenna for the fourth segment;
one or more additional segment transmitters to generate a third segment signal at the first frequency and a fourth segment signal at the second frequency, wherein the third segment antenna is configured to radiate the third segment signal and the fourth segment antenna is configured to radiate the fourth segment signal; and
a second tile transmitter to generate a second tile signal at a fourth frequency that is different from the first frequency, the second frequency, and the third frequency, wherein the third segment antenna and the fourth segment antenna are configured to radiate the second tile signal.

8. The system of claim 7, wherein the smart floor tile and the second smart floor tile are physically arranged such that:
the first segment antenna is proximate to the third segment antenna, and
the second segment antenna is proximate to the fourth segment antenna.

9. The system of claim 4, the smart floor tile further comprising:
a communication interface.
a memory storing the computer-executable instructions.

10. The system of claim 4, the smart floor tile further comprising:
a communication interface;
a memory storing the computer-executable instructions; and
wherein the tile output data is further indicative of received signal strength of one or more of the tile signals or segment signals received by the receiver.

11. The system of claim 4, wherein the one or more segment transmitters and the tile transmitter are configured to transmit simultaneously with operation of the receiver.

12. The system of claim 4, further comprising:
a fixture comprising:
one or more fixture antennas;
at least a second receiver connected to the one or more fixture antennas;
a first communication interface;
a first memory storing second computer-executable instructions; and
a second hardware processor to execute the second computer-executable instructions to:
generate fixture data indicative of tile signals and segment signals received by the at least second receiver using one or more of the one or more fixture antennas.

13. The system of claim 12, wherein the fixture comprises one or more lanes for stowage of items and further wherein each lane is associated with a particular one of the one or more fixture antennas.

14. The system of claim 12, further comprising:
a computing device comprising:
a second communication interface;
a third memory storing third computer-executable instructions; and
a third hardware processor to execute the third computer-executable instructions to:
receive the fixture data, wherein the fixture data includes data indicative of received signal strength of the tile signals and segment signals received by the at least second receiver;
determine the one or more fixture antennas that exhibit a greatest received signal strength of one or more of the tile signals or the segment signals received by the at least second receiver;
determine a position with respect to a shelf of one or more antennas at the shelf; and
generate interaction data indicative of activity associated with the position.

15. The system of claim 4, further comprising:
a computing device comprising:
a second communication interface;
a second memory storing second computer-executable instructions; and
a second hardware processor to execute the second computer-executable instructions to:
receive fixture data;
determine one or more antennas at a shelf that exhibit a greatest received signal strength of one or more of tile signals or segment signals; and
determine, for the fixture data obtained using the one or more antennas at the shelf that exhibit a greatest received signal strength, first received characteristic data that is indicative of the tile signals and the segment signals and their respective received signal strengths.

16. The system of claim 15, the second hardware processor further executing the second computer-executable instructions to:
determine a first set of the one or more antennas at the shelf that exhibit a received signal strength above a threshold of one or more of the tile signals or the segment signals;
determine, for the fixture data obtained using the first set, second received characteristic data that is indicative of the tile signals and the segment signals and their respective received signal strengths;
determine a first position with respect to the shelf of the first set;
determine a second set of the one or more antennas at the shelf that exhibit a received signal strength of the one or more of the tile signals or the segment signals that are above the threshold;
determine, for the fixture data obtained using the second set, third received characteristic data that is indicative of the tile signals and segment signals and their respective received signal strengths, wherein the second received characteristic data is different from the third received characteristic data;
determine a second position with respect to the shelf of the second set; and
generate interaction data indicative of a first user at the first position and a second user at the second position.

17. The system of claim 15, the second hardware processor further executing the second computer-executable instructions to:
access tracking data indicative of a location of a user with respect to one or more smart floor tiles;
determine expected characteristic data of the user based on the location;
determine the first received characteristic data and the expected characteristic data are similar; and
generate interaction data indicative of presence of the user at the shelf.

18. The system of claim 4, further comprising:
a device comprising:
- a second receiver connected to device antenna;
- a first communication interface;
- a first memory storing second computer-executable instructions; and
- a second hardware processor to execute the second computer-executable instructions to:
  - generate received characteristic data indicative of received signal strength of tile signals and segment signals received by the second receiver; and
  - send, using the first communication interface, the received characteristic data to a computing device.

19. The system of claim 4, further comprising:
a computing device comprising:
- a second communication interface;
- a second memory storing second computer-executable instructions; and
- a second hardware processor to execute the second computer-executable instructions to:
  - access data indicative of a location of a plurality of smart floor tiles with respect to one another;
  - access transmitted characteristic data indicative of the tile signals and segment signals as emitted by respective ones of the plurality of smart floor tiles;
  - receive received characteristic data; and
  - determine a location of the computing device with respect to the plurality of smart floor tiles by comparing the received characteristic data to the transmitted characteristic data.

20. A method comprising:
transmitting, from each of a plurality of smart floor tiles, each smart floor tile divided into at least a first segment and a second segment, a transmitted plurality of signals, wherein the transmitted plurality of signals includes a first segment signal generated by a first transmitter of the first segment at a first frequency, a second segment signal generated by a second transmitter of the second segment at a second frequency and a tile signal generated by a tile transmitter at a third frequency;
receiving, using one or more receivers of at least a portion of the plurality of smart floor tiles, a received plurality of signals;
generating, using the received plurality of signals, received characteristic data indicative of corresponding frequencies of the received plurality of signals; and
generating tile output data indicative of a particular smart floor tile and the received characteristic data obtained by that particular smart floor tile.

21. The method of claim 20, wherein the plurality of smart floor tiles comprises a first smart floor tile and a second smart floor tile, the method further comprising:
determining first received characteristic data received at the first smart floor tile, wherein the first received characteristic data is indicative of the transmitted plurality of signals from the second smart floor tile;
determining second received characteristic data received at the second smart floor tile, wherein the second received characteristic data is indicative of the transmitted plurality of signals from the first smart floor tile; and
generating tracking data indicative of a location of a user at the first smart floor tile and the second smart floor tile.

22. The method of claim 20, further comprising:
determining a first pair of smart floor tiles having respective tile output data indicative of contemporaneous transmission of their respective transmitted plurality of signals at a first time;
determining a first location of an object at the first time using a location of the smart floor tiles in the first pair;
determining a second pair of smart floor tiles having respective tile output data indicative of contemporaneous transmission of their respective transmitted plurality of signals at a second time, wherein the second pair includes one of the smart floor tiles of the first pair;
determining a second location of the object at the second time using a location of the smart floor tiles in the second pair; and
generating tracking data indicative of a change in location of the object from the first location at the first time to the second location at the second time.

23. The method of claim 20, further comprising:
receiving, using one or more second receivers having a plurality of antennas installed at a fixture, a second received plurality of signals;
determining, using received signal strength of at least a portion of the second received plurality of signals as acquired using the plurality of antennas installed at the fixture, a position of an object with respect to the fixture, wherein the object provides a signal path for the second received plurality of signals;
determining shelf received characteristic data, wherein the shelf received characteristic data is indicative of the second received plurality of signals and respective signal strengths of individual signals therein; and
determining a user account associated with the shelf received characteristic data.

24. A method comprising:
transmitting, from a first smart floor tile divided into at least a first segment and a second segment, a first plurality of signals, wherein the first plurality of signals includes a first segment signal generated by a first transmitter of the first segment at a first frequency, a second segment signal generated by a second transmitter of the second segment at a second frequency, and a first tile signal generated by a first tile transmitter at a third frequency;
transmitting, from a second smart floor tile divided into at least a fourth segment and a fifth segment, a second plurality of signals, wherein the second plurality of signals includes a fourth segment signal generated by a fourth transmitter of the fourth segment at a fourth frequency, a fifth segment signal generated by a fifth transmitter of the fifth segment at a fifth frequency, and a second tile signal generated by a second tile transmitter at a sixth frequency;
receiving, with a first receiver, one or more of the first plurality of signals and the second plurality of signals;
generating first received characteristic data indicative of corresponding frequencies of one or more of the first plurality of signals or the second plurality of signals; and
generating first output data indicative of a particular smart floor tile and the first received characteristic data obtained by the particular smart floor tile.

25. The method of claim 24, wherein the first receiver is located at the first smart floor tile; and further comprising:
receiving, with a second receiver, one or more of the first plurality of signals and the second plurality of signals;
generating second received characteristic data indicative of a frequency and signal strength of one or more of the first plurality of signals and the second plurality of signals as received by the second receiver;
generating second output data indicative of the second received characteristic data obtained by the second receiver; and
generating, using the first output data and the second output data, tracking data indicative of a location of a user at the first smart floor tile and the second smart floor tile.

26. A system comprising:
a first smart floor tile comprising:
   at least a first segment and a second segment;
   a first segment antenna of the first segment;
   a second segment antenna of the second segment;
   a first transmitter of the first segment to generate a first segment signal at a first frequency, wherein the first segment antenna is configured to radiate the first segment signal;
   a second transmitter of the second segment to generate a second segment signal at a second frequency, wherein the second segment antenna is configured to radiate the second segment signal;
   a first tile transmitter to generate a first tile signal at a third frequency;
   a first receiver connected to at least one or more of the first segment antenna and the second segment antenna; and
   a first hardware processor to execute first computer-executable instructions to generate first tile output data indicative of first tile signals and first segment signals received by the first receiver; and
a second smart floor tile comprising:
   at least a fourth segment and a fifth segment;
   a fourth segment antenna of the fourth segment;
   a fifth segment antenna of the fifth segment;
   a fourth transmitter to generate a fourth segment signal at a fourth frequency, wherein the fourth segment antenna is configured to radiate the fourth segment signal;
   a fifth transmitter to generate a fifth segment signal at a fifth frequency, wherein the fifth segment antenna is configured to radiate the fifth segment signal;
   a second tile transmitter to generate a second tile signal at a sixth frequency;
   a second receiver connected to at least one or more of the fourth segment antenna and the fifth segment antenna; and
   a second hardware processor to execute second computer-executable instructions to generate second tile output data indicative of second tile signals and second segment signals received by the second receiver.

* * * * *